US012699459B2

(12) United States Patent
Parida et al.

(10) Patent No.: US 12,699,459 B2
(45) Date of Patent: Aug. 4, 2026

(54) METHODS AND APPARATUS FOR ENABLING DYNAMIC GESTURE INPUT FOR MICRO-GESTURE RECOGNITION

(71) Applicant: Samsung Electronics Co., Ltd., Suwon-si (KR)

(72) Inventors: Priyabrata Parida, Garland, TX (US); Vutha Va, Plano, TX (US); Anum Ali, Plano, TX (US); Saifeng Ni, Santa Clara, CA (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 18/187,634

(22) Filed: Mar. 21, 2023

(65) Prior Publication Data
US 2024/0028127 A1    Jan. 25, 2024

Related U.S. Application Data

(60) Provisional application No. 63/391,608, filed on Jul. 22, 2022.

(51) Int. Cl.
| | |
|---|---|
| *G06F 3/01* | (2006.01) |
| *G01S 7/41* | (2006.01) |
| *G06T 7/215* | (2017.01) |

(52) U.S. Cl.
CPC ............. *G06F 3/017* (2013.01); *G01S 7/415* (2013.01); *G06T 7/215* (2017.01);
(Continued)

(58) Field of Classification Search
CPC .......... G06F 3/017; G01S 7/415; G01S 7/006; G01S 13/582; G06T 7/174; G06T 7/246;
(Continued)

(56) References Cited

U.S. PATENT DOCUMENTS

| | | | |
|---|---|---|---|
| 8,620,024 B2 | 12/2013 | Huang et al. | |
| 10,248,216 B2 | 4/2019 | Liu | |

(Continued)

FOREIGN PATENT DOCUMENTS

| | | |
|---|---|---|
| WO | 2020191070 A1 | 9/2020 |
| WO | 2021184356 A1 | 9/2021 |

OTHER PUBLICATIONS

Y. Wang, A. Ren, M. Zhou, W. Wang and X. Yang, "A Novel Detection and Recognition Method for Continuous Hand Gesture Using FMCW Radar," in IEEE Access, vol. 8, pp. 167264-167275, 2020 (Year: 2020).*

*Primary Examiner* — Vladimir Magloire
*Assistant Examiner* — Anna K. Gosling

(57) ABSTRACT

A method includes obtaining a target distance and target velocity for each radar frame within a sliding input data window. Each radar frame within the data window includes extracted features. The method includes determining a dynamic threshold distance $(d_{th})$ for a range of distances wherein performance of a gesture is valid. The method includes determining whether the target distance corresponding to a current radar frame satisfies a proximity condition based on the $d_{th}$. The method includes in response to a determination the proximity condition is not satisfied, detecting a start of activity based on the extracted features. The method includes segmenting gesture frames from non-gesture frames in the data window, in response to at least one of: a determination the first proximity condition is satisfied, or a determination the current radar frame includes an end of the activity. The method includes discarding the non-gesture frames to modify the data window.

21 Claims, 15 Drawing Sheets

(52) U.S. Cl.
CPC ............... *G06T 2207/10028* (2013.01); *G06T 2207/20021* (2013.01); *G06T 2207/20081* (2013.01); *G06T 2207/20084* (2013.01); *G06T 2207/30196* (2013.01)

(58) Field of Classification Search
CPC . G06T 7/521; G06T 7/55; G06T 2207/10028; G06T 2207/20021; G06T 2207/20081; G06T 2207/20084; G06T 2207/30196; G06V 40/28
See application file for complete search history.

(56) References Cited

U.S. PATENT DOCUMENTS

| | | |
|---|---|---|
| 11,221,681 B2 | 1/2022 | Wang et al. |
| 2014/0002338 A1 | 1/2014 | Raffa et al. |
| 2020/0300996 A1 | 9/2020 | Cetinoneri et al. |
| 2020/0336222 A1 | 10/2020 | Rimini |
| 2020/0356178 A1 | 11/2020 | Qui et al. |
| 2021/0103348 A1* | 4/2021 | Jeppsson ............. G06F 3/04845 |
| 2022/0067354 A1 | 3/2022 | Shao et al. |

\* cited by examiner

200

210

205

230

225

SPEAKER(S)

RX PROCESSING CIRCUITRY

TRANSCEIVER(S)
RADAR TRANSCEIVER

270

220

215

MICROPHONE

TX PROCESSING CIRCUITRY

240

250

I/O IF

PROCESSOR(S)

INPUT

245

SENSOR(S)

DISPLAY

265

255

260

MEMORY

OPERATING SYSTEM (OS) — 261

APPLICATIONS — 262

| | Total Samples | No. of samples cut at beginning | No. of samples cut at end | Median no. of frames missed |
|---|---|---|---|---|
| Circle Radial | 93 | 5 | 0 | 3 |
| Circle Tangential | 98 | 3 | 0 | 4 |
| Pinch Double | 97 | 12 | 0 | 2 |
| Pinch Single | 98 | 12 | 0 | 2 |
| Swipe L2R | 110 | 4 | 0 | 3.5 |
| Swipe R2L | 109 | 13 | 0 | 2 |
| Total | 605 | 49 | 0 | |

FIG. 16

| | Total Samples | Num. detections ADM and GS | Num. detections ADM only | False positives (ADM and GS) | False positives (ADM only) |
|---|---|---|---|---|---|
| Circle Radial | 93 | 94 | 144 | 1 | 51 |
| Circle Tangential | 98 | 99 | 141 | 1 | 43 |
| Pinch Double | 97 | 96 | 167 | 0 | 70 |
| Pinch Single | 98 | 98 | 215 | 0 | 117 |
| Swipe L2R | 110 | 104 | 199 | 0 | 89 |
| Swipe R2L | 109 | 109 | 203 | 0 | 94 |
| Total | 605 | 600 | 1069 | 2 | 464 |

FIG. 17

| | Median latency (in ms) ADM and GS | Median latency (in ms) ADM only |
|---|---|---|
| Circle Radial | 504 | 714 |
| Circle Tangential | 546 | 924 |
| Pinch Double | 546 | 798 |
| Pinch Single | 546 | 882 |
| Swipe L2R | 462 | 840 |
| Swipe R2L | 504 | 798 |
| Average | 518 | 826 |

FIG. 18

METHODS AND APPARATUS FOR ENABLING DYNAMIC GESTURE INPUT FOR MICRO-GESTURE RECOGNITION

CROSS-REFERENCE TO RELATED APPLICATION(S) AND CLAIM OF PRIORITY

This application claims priority under 35 U.S.C. § 119(e) to U.S. Provisional Patent Application No. 63/391,608 filed on Jul. 22, 2022. The above-identified provisional patent application is hereby incorporated by reference in its entirety.

TECHNICAL FIELD

This disclosure relates generally to radar systems. More specifically, this disclosure relates to methods for enabling dynamic gesture input for micro-gesture recognition and an apparatus therefor.

BACKGROUND

Voice and gestural interactions are becoming increasingly popular in the context of ambient computing. These input methods allow the user to interact with digital devices, e.g., smart TVs, smartphones, tablets, smart home devices, AR/VR glasses etc., while performing other tasks, e.g., cooking and dining. Gestural interactions can be more effective than voice, particularly for simple interactions such as snoozing an alarm or controlling a multimedia player. For such simple interactions, gestural interactions have two main advantages over voice-based interactions, namely, complication and social-acceptability. First, the voice-based commands can often be long, and the user has to initiate with a hot word. Second, in quiet places and during conversations, the voice-based interaction can be socially awkward.

Gestural interaction with a digital device can be based on different sensor types, e.g., ultrasonic, IMU, optic, and radar. Optical sensors give the most favorable gesture recognition performance. The limitations of optic sensor based solutions, however, are sensitivity to ambient lighting conditions, privacy concerns, and battery consumption. Hence, optic sensor based solution have the inability to run for long periods of time. LIDAR based solutions can overcome some of these challenges such as lighting conditions and privacy, but the cost is still prohibitive (currently, only available in high-end devices).

SUMMARY

This disclosure provides methods for enabling dynamic gesture input for micro-gesture recognition and an apparatus therefor.

In one embodiment, a method for enabling dynamic gesture input for micro-gesture recognition is provided. The method includes obtaining a target distance and target velocity for each radar frame within a sliding input data window that includes a current radar frame and previous radar frames from radar data. Each radar frame within the data window includes extracted features of at least one of time-velocity data (TVD) or time angle data (TAD). The method includes determining, based on the TVD or TAD, a dynamic threshold distance $(d_{th})$ for a range of distances within which performance of a gesture is valid. The method includes determining whether the target distance corresponding to the current radar frame satisfies a first proximity condition based on the threshold distance $(d_{th})$. The method includes in response to a determination that the first proximity condition is not satisfied, detecting a start of activity based on the TVD or TAD. The method includes triggering a gesture segmenter (GS) to segment gesture frames from non-gesture frames in the data window, in response to at least one of: a determination that the first proximity condition is satisfied, or a determination that the current radar frame includes an end of the activity. The method includes modifying, using the GS, the data window by discarding the non-gesture frames.

In another embodiment, an electronic device for enabling dynamic gesture input for micro-gesture recognition is provided. The electronic device includes a transceiver and a processor operatively connected to the transceiver. The processor is configured to obtain a target distance and target velocity for each radar frame within a sliding input data window that includes a current radar frame and previous radar frames from radar data. Each radar frame within the data window includes extracted features of at least one of time-velocity data (TVD) or time angle data (TAD). The processor is configured to determine, based on the TVD or TAD, a dynamic threshold distance $(d_{th})$ for a range of distances within which performance of a gesture is valid. The processor is configured to determine whether the target distance corresponding to the current radar frame satisfies a first proximity condition based on the threshold distance $(d_{th})$. The processor is configured to in response to a determination that the first proximity condition is not satisfied, detect a start of activity based on the TVD or TAD. The processor is configured to trigger a gesture segmenter (GS) to segment gesture frames from non-gesture frames in the data window, in response to at least one of: a determination that the first proximity condition is satisfied, or a determination that the current radar frame includes an end of the activity. The processor is configured to modify, using the GS, the data window by discarding the non-gesture frames.

In yet another embodiment, a non-transitory computer readable medium comprising program code for enabling dynamic gesture input for micro-gesture recognition is provided. The computer program includes computer readable program code that when executed causes at least one processor to obtain a target distance and target velocity for each radar frame within a sliding input data window that includes a current radar frame and previous radar frames from radar data. Each radar frame within the data window includes extracted features of at least one of time-velocity data (TVD) or time angle data (TAD). The computer readable program code causes the processor to determine, based on the TVD or TAD, a dynamic threshold distance $(d_{th})$ for a range of distances within which performance of a gesture is valid. The computer readable program code causes the processor to determine whether the target distance corresponding to the current radar frame satisfies a first proximity condition based on the threshold distance $(d_{th})$. The computer readable program code causes the processor to in response to a determination that the first proximity condition is not satisfied, detect a start of activity based on the TVD or TAD. The computer readable program code causes the processor to trigger a gesture segmenter (GS) to segment gesture frames from non-gesture frames in the data window, in response to at least one of: a determination that the first proximity condition is satisfied, or a determination that the current radar frame includes an end of the activity. The computer readable program code causes the processor to modify, using the GS, the data window by discarding the non-gesture frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to"

another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 16, 17, and 18 illustrate tables that demonstrate the effectiveness of the gesture segmenter in terms of various metrics, in accordance with an embodiment of this disclosure.

DETAILED DESCRIPTION

Figure 1:
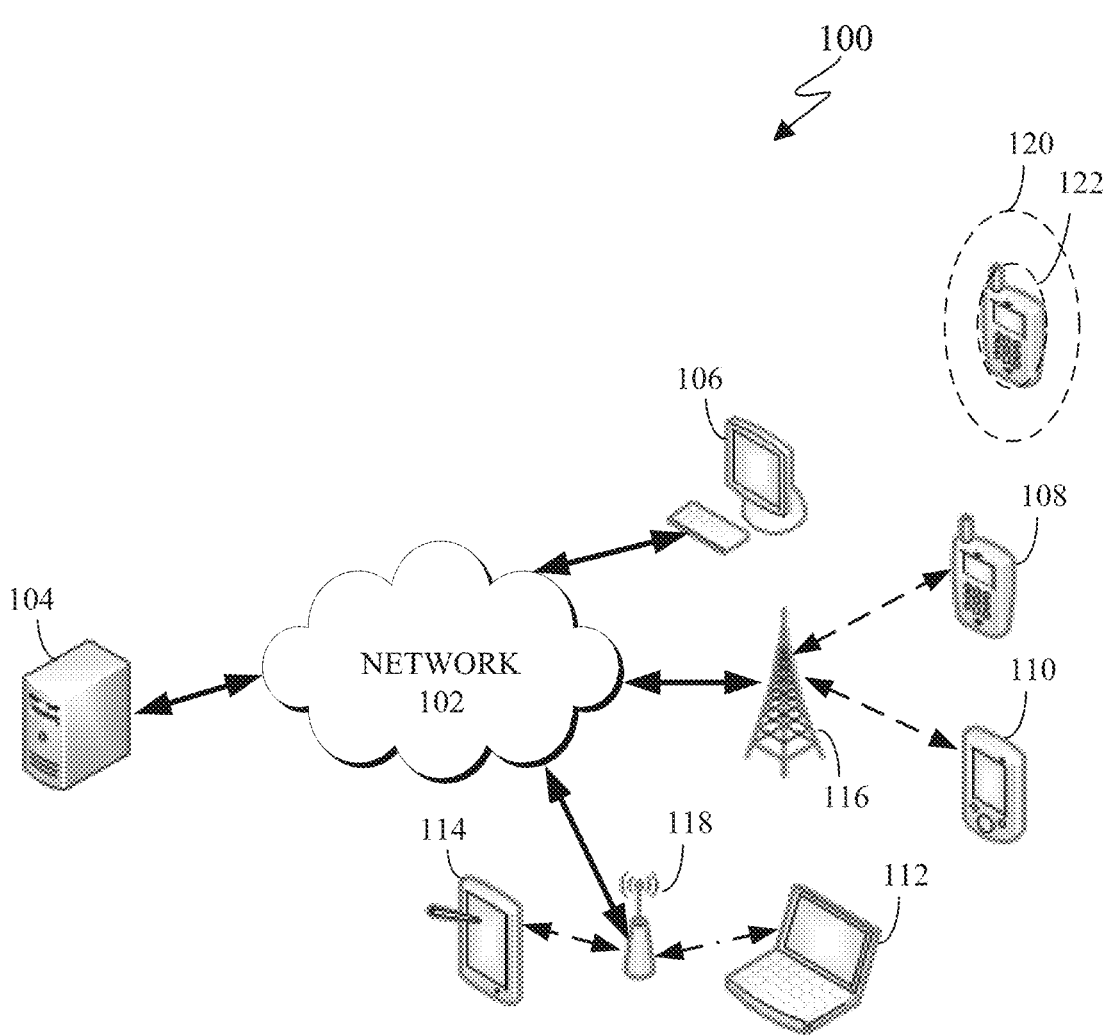
FIG. 1 illustrates an example communication system in accordance with an embodiment of this disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication device.

The superior spatial and Doppler resolution of Millimeter wave (mmWave) radars have opened up new horizons for human-computer interaction (HCl), where smart devices, such as the smartphone, can be controlled through micro-gestures. The gesture-based control of the device is enabled by a gesture recognition module (GRM), which includes multiple functional blocks such as a feature extractor, proximity detection module (PDM), activity detection module (ADM), gesture classifier (GC), etc.

One of the scenarios in the micro-gesture recognition system is the hand approaching the mmWave radar device, performing the gesture, and moving away from the device. Although very specific, this dynamic gesture input scenario may be frequently encountered. This disclosure provides an efficient solution to handle this specific scenario.

To tackle this problem, one solution is to implement some or all of the GRM blocks using complex neural networks. However, neural networks consume a lot of computational resources that adversely affect the battery life, thus, computationally frugal rule-based implementation of some of these GRM blocks is an attractive option. Among all the blocks, the GC is usually difficult to implement using a rule-based method, as the GC is extremely challenging to consider all the events in developing a reliable set of rules for gesture classification. Hence, it is preferable for the GC may to be implemented using data-driven machine learning based (ML-based) techniques. That leaves the rest of the blocks for rule-based implementations by efficiently utilizing the statistics of the underlying physical features. Further, the implementation of the rule-based blocks should complement an efficient operation of the GC. For the problem at hand, according to the embodiments of this disclosure, the functional blocks preceding the GC process a sliding window of input radar data and accurately separate the gesture segment of the sliding window from the hand approaching/receding segments. One advantage of this modular approach is that the ML-based GC could be trained with data that only corresponds to the gesture segments. Otherwise, the data to train the GC model is data containing the hand approaching and receding segments and is a large amount of data. A second advantage of this segmented implementation is that the dimension of the input data to the GC can be smaller compared to the unsegmented implementation such that the segmented implementation may result in a less complex neural network. Further, appropriate segmentation of the gesture segment from the hand approaching and hand receding frames may also result in reduced latency. Owing to these advantages, this disclosure provides mechanisms for the rule-based functional blocks and enable a modular implementation of the gesture recognition system that efficiently handles the aforementioned specific but frequent scenario of the dynamic gesture input.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example communication system in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver. In certain embodiments, the client devices 106-114 are able to sense the presence of an object located close to the client device and determine whether the location of the detected object is within a first area 120 or a second area 122 closer to the client device than a remainder of the first area 120 that is external to the first area 120. In certain embodiments, the boundary of the second area 122 is at a predefined proximity (e.g., 5 centimeters away) that is closer to the client device than the boundary of the first area 120, and the first area 120 can be a within a different predefined range (e.g., 30 meters away) from the client device where the user is likely to perform a gesture.

In this example, some client devices 108 and 110-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
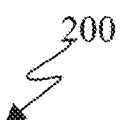
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array 205 including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of downlink (DL) channel signals and the transmission of uplink (UL) channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

The electronic device 200 as used herein can include a transceiver that can both transmit and receive radar signals. For example, the transceiver(s) 210 includes a radar transceiver 270, as described more particularly below. In this embodiment, one or more transceivers in the transceiver(s) 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna). The radar transceiver 270 can transmit signals at a various frequencies. For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. In some embodiments, the radar transceiver 270 can be associated with the input 250 to provide additional inputs to the processor 240.

Figures 3, 4:
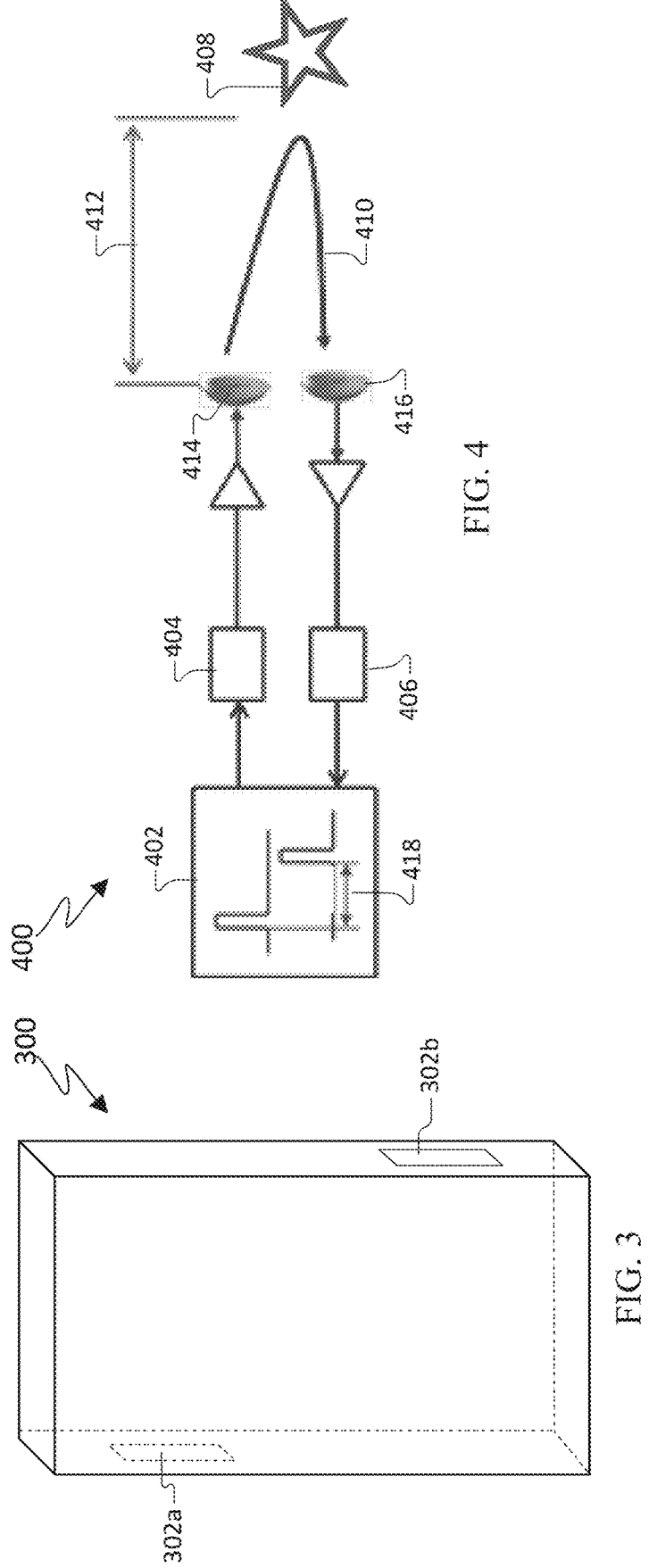
FIG. 3 illustrates a three-dimensional view of an example electronic device that includes multiple millimeter wave (mmWave) antenna modules in accordance with an embodiment of this disclosure.
FIG. 4 illustrates an example architecture of a monostatic radar in an electronic device 400 in accordance with an embodiment of this disclosure.

In certain embodiments, the radar transceiver 270 is a monostatic radar. A monostatic radar includes a transmitter of a radar signal and a receiver, which receives a delayed echo of the radar signal, which are positioned at the same or similar location. For example, the transmitter and the receiver can use the same antenna or nearly co-located while using separate, but adjacent antennas. Monostatic radars are assumed coherent such that the transmitter and receiver are synchronized via a common time reference. FIG. 4, below, illustrates an example monostatic radar.

In certain embodiments, the radar transceiver 270 can include a transmitter and a receiver. In the radar transceiver 270, the transmitter of can transmit millimeter wave (mmWave) signals. In the radar transceiver 270, the receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

FIG. 3 illustrates a three-dimensional view of an example electronic device 300 that includes multiple millimeter wave (mmWave) antenna modules 302 in accordance with an embodiment of this disclosure. The electronic device 300 could represent one or more of the client devices 106-114 in FIG. 1 or the electronic device 200 in FIG. 2. The embodiments of the electronic device 300 illustrated in FIG. 3 are for illustration only, and other embodiments can be used without departing from the scope of the present disclosure.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

The first antenna module 302a and the second antenna module 302b are positioned at the left and the right edges of the electronic device 300. For simplicity, the first and second antenna modules 302a-302b are generally referred to as an antenna module 302. In certain embodiments, the antenna module 302 includes an antenna panel, circuitry that connects the antenna panel to a processor (such as the processor 240 of FIG. 2), and the processor.

The electronic device 300 can be equipped with multiple antenna elements. For example, the first and second antenna modules 302a-302b are disposed in the electronic device 300 where each antenna module 302 includes one or more antenna elements. The electronic device 300 uses the antenna module 302 to perform beamforming when the electronic device 300 attempts to establish a connection with a base station (for example, base station 116).

FIG. 4 illustrates an example architecture of a monostatic radar in an electronic device 400 in accordance with an embodiment of this disclosure. The embodiments of the architecture of the monostatic radar illustrated in FIG. 4 are for illustration only and other embodiments can be used without departing from the scope of the present disclosure.

The electronic device 400 that includes a processor 402, a transmitter 404, and a receiver 406. The electronic device 400 can be similar to any of the client devices 106-114 of FIG. 1, the electronic device 200 of FIG. 2, or the electronic device 300 of FIG. 3. The processor 402 is similar to the processor 240 of FIG. 2. Additionally, the transmitter 404 and the receiver 406 can be included within the radar transceiver 270 of FIG. 2. The radar can be used to detect the range, velocity and/or angle of a target object 408. Operating at mmWave frequency with GHz of bandwidth (e.g., 2, 3, 5 or 7 GHz bandwidth), the radar can be useful for applications such as proximity sensing, gesture recognition, liveness detection, mmWave blockage detection, and so on.

The transmitter 404 transmits a signal 410 (for example, a monostatic radar signal) to the target object 408. The target object 408 is located a distance 412 from the electronic device 400. In certain embodiments, the target object 408 corresponds to the objects that form the physical environment around the electronic device 400. For example, the transmitter 404 transmits a signal 410 via a transmit antenna 414. The signal 410 reflects off of the target object 408 and is received by the receiver 406 as a delayed echo, via a receive antenna 416. The signal 410 represents one or many signals that can be transmitted from the transmitter 404 and reflected off of the target object 408. The processor 402 can identify the information associated with the target object 408 based on the receiver 406 receiving the multiple reflections of the signals.

The processor 402 analyzes a time difference 418 from when the signal 410 is transmitted by the transmitter 404 and received by the receiver 406. The time difference 418 is also referred to as a delay, which indicates a delay between the transmitter 404 transmitting the signal 410 and the receiver 406 receiving the signal after the signal is reflected or bounced off of the target object 408. Based on the time difference 418, the processor 402 derives the distance 412 between the electronic device 400, and the target object 408. The distance 412 can change when the target object 408 moves while electronic device 400 is stationary. The distance 412 can change when the electronic device 400 moves while the target object 408 is stationary. Also, the distance 412 can change when the electronic device 400 and the target object 408 are both moving. As described herein, the electronic device 400 that includes the architecture of a monostatic radar is also referred to as a radar 400.

The signal 410 can be a radar pulse as a realization of a desired "radar waveform," modulated onto a radio carrier frequency. The transmitter 404 transmits the radar pulse signal 410 through a power amplifier and transmit antenna 414, either omni-directionally or focused into a particular direction. A target (such as target 408), at a distance 412 from the location of the radar (e.g., location of the transmit antenna 414) and within the field-of-view of the transmitted signal 410, will be illuminated by RF power density $p_t$ (in units of W/m²) for the duration of the transmission of the radar pulse. Herein, the distance 412 from the location of the radar to the location of the target 408 is simply referred to as "R" or as the "target distance." To first order, $p_t$ can be described by Equation 1, where $P_T$ represents transmit power in units of watts (W), $G_T$ represents transmit antenna gain in units of decibels relative to isotropic (dBi), $A_T$ represents effective aperture area in units of square meters (m²), and $\lambda$ represents wavelength of the radar signal RF carrier signal in units of meters. In Equation 1, effects of atmospheric attenuation, multi-path propagation, antenna losses, etc. have been neglected.

$$p_t = \frac{P_T}{4\pi R^2} G_T = \frac{P_T}{4\pi R^2} \frac{A_T}{\left(\lambda^2/4\pi\right)} = P_T \frac{A_T}{\lambda^2 R^2} \qquad (1)$$

The transmit power density impinging onto the surface of the target will reflect into the form of reflections depending on the material composition, surface shape, and dielectric behavior at the frequency of the radar signal. Note that off-direction scattered signals are typically too weak to be received back at the radar receiver (such as receive antenna 416 of FIG. 4), so typically, only direct reflections will contribute to a detectable receive signal. In essence, the illuminated area(s) of the target with normal vectors pointing back at the receiver will act as transmit antenna apertures with directivities (gains) in accordance with corresponding effective aperture area(s). The power of the reflections, such as direct reflections reflected and received back at the radar receiver, can be described by Equation 2, where $P_{refl}$ represents effective (isotropic) target-reflected power in units of watts, $A_t$ represents effective target area normal to the radar direction in units of $m^2$, $G_t$ represents corresponding aperture gain in units of dBi, and RCS represents radar cross section in units of square meters. Also in Equation 2, $r_t$ represents reflectivity of the material and shape, is unitless, and has a value between zero and one inclusively ([0, . . . , 1]). The RCS is an equivalent area that scales proportional to the actual reflecting area-squared, inversely proportional with the wavelength-squared, and is reduced by various shape factors and the reflectivity of the material itself. For a flat, fully reflecting mirror of area $A_f$, large compared with $\lambda^2$, $$RCS = 4\pi A_t^2/\lambda^2.$$

Due to the material and shape dependency, it is generally not possible to deduce the actual physical area of a target from the reflected power, even if the target distance R is known. Hence, the existence of stealth objects that choose material absorption and shape characteristics carefully for minimum RCS.

$$P_{refl} = p_t A_t G_t \sim p_t A_t r_t \frac{A_t}{\left(\lambda^2/4\pi\right)} = p_t RCS \tag{2}$$

The target-reflected power ($P_R$) at the location of the receiver results from the reflected-power density at the reverse distance R, collected over the receiver antenna aperture area. For example, the target-reflected power ($P_R$) at the location of the receiver can be described by Equation 3, where $A_R$ represents the receiver antenna effective aperture area in units of square meters. In certain embodiments, $A_R$ may be the same as $A_T$.

$$P_R = \frac{P_{refl}}{4\pi R^2} A_R = P_T \cdot RCS \frac{A_T A_R}{4\pi\lambda^2 R^4} \tag{3}$$

The target distance R sensed by the radar 400 is usable (for example, reliably accurate) as long as the receiver signal exhibits sufficient signal-to-noise ratio (SNR), the particular value of which depends on the waveform and detection method used by the radar 400 to sense the target distance. The SNR can be expressed by Equation 4, where k represents Boltzmann's constant, T represents temperature, and kT is in units of W/Hz]. In Equation 4, B represents bandwidth of the radar signal in units of Hertz (Hz), F represents receiver noise factor. The receiver noise factor represents degradation of receive signal SNR due to noise contributions of the receiver circuit itself.

$$SNR = \frac{P_R}{kT \cdot B \cdot F} \tag{4}$$

If the radar signal is a short pulse of duration $T_p$ (also referred to as pulse width), the delay $\tau$ between the transmission and reception of the corresponding echo can be expressed according to Equation 5, where c is the speed of (light) propagation in the medium (air).

$$\tau = 2R/c \tag{5}$$

In a scenario in which several targets are located at slightly different distances from the radar 400, the individual echoes can be distinguished as such if the delays differ by at least one pulse width. Hence, the range resolution ($\Delta R$) of the radar 400 can be expressed according to Equation 6.

$$\Delta R = c\Delta\tau/2 = cT_P/2 \tag{6}$$

If the radar signal is a rectangular pulse of duration $T_P$, the rectangular pulse exhibits a power spectral density P(f) expressed according to Equation 7. The rectangular pulse has a first null at its bandwidth B, which can be expressed according to Equation 8. The range resolution $\Delta R$ of the radar 400 is fundamentally connected with the bandwidth of the radar waveform, as expressed in Equation 9.

$$P(f) \sim \left(\sin(\pi f T_P)/(\pi f T_P)\right)^2 \tag{7}$$

$$B = 1/T_P \tag{8}$$

$$\Delta R = c/2B \tag{9}$$

Although FIG. 4 illustrates one example radar 400, various changes can be made to FIG. 4. For example, the radar 400 could include hardware implementing a monostatic radar with 5G communication radio, and the radar can utilize a 5G waveform according to particular needs. In another example, the radar 400 could include hardware implementing a standalone radar, in which case, the radar transmits its own waveform (such as a chirp) on non-5G frequency bands such as the 24 GHz industrial, scientific and medical (ISM) band. In another particular example, the radar 400 could include hardware of a 5G communication radio that is configured to detect nearby objects, namely, the 5G communication radios has a radar detection capability.

Figures 5A, 5B, 5C:
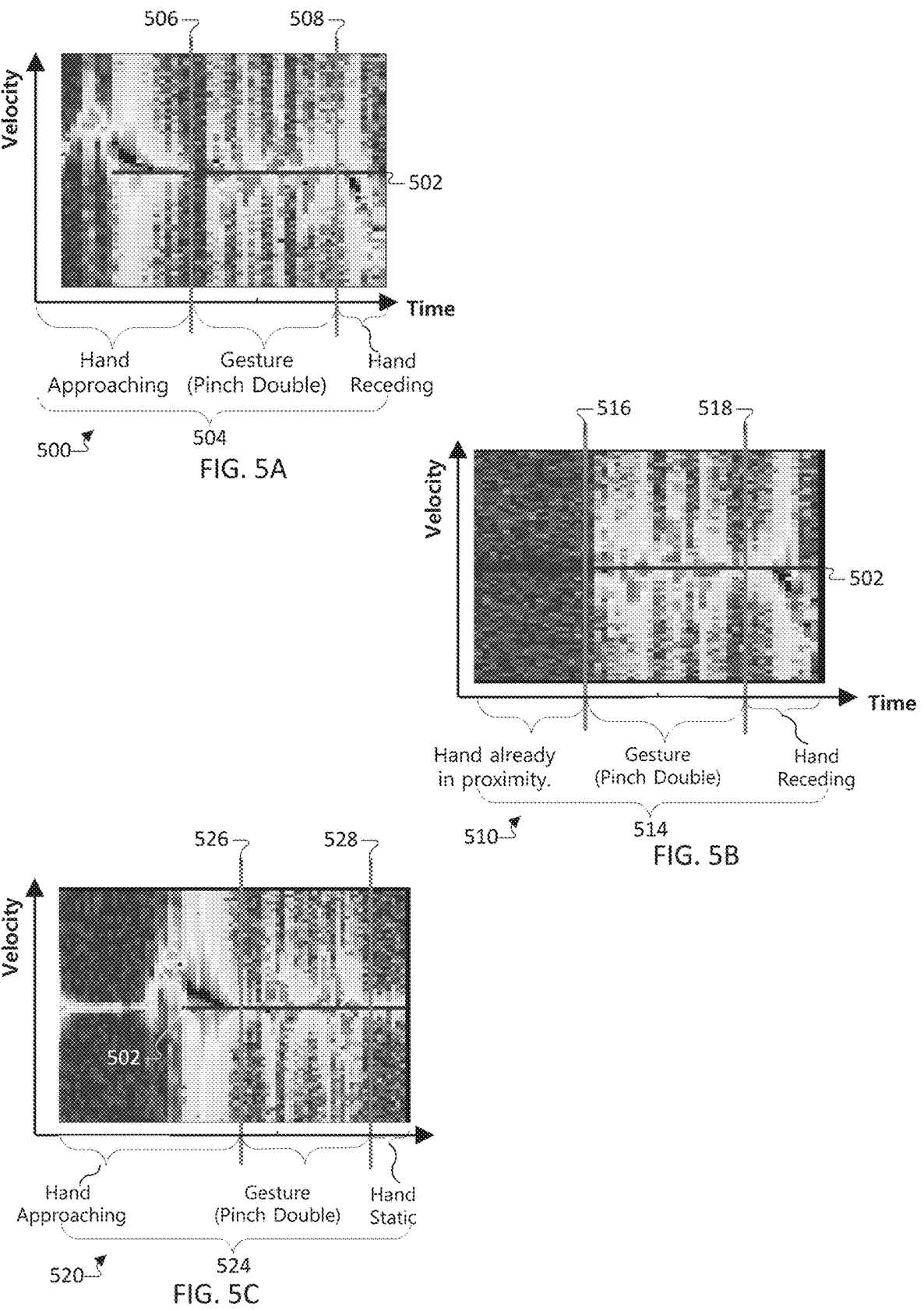
FIGS. 5A, 5B, and 5C illustrate various examples of extracted features that are extracted from raw radar data in accordance with an embodiment of this disclosure.

FIGS. 5A-5C illustrate various examples of extracted features that are extracted from raw radar data in accordance with an embodiment of this disclosure. The embodiments of the extracted features shown in FIGS. 5A-5C are for illustration only, and other embodiments could be used without departing from the scope of this disclosure. FIGS. 5A, 5B, and 5C illustrate various examples of a time-velocity data (TVD) for a double-pinch gesture in accordance with Scenarios 1, 2, and 3, respectively, in accordance with this disclosure.

This disclosure describes various possible scenarios corresponding to the dynamic gesture input. Embodiments of this disclosure implement a three step solution to efficiently segment the gesture activities from the non-gesture activities related to approaching/receding of a hand of a user of an electronic device that includes a radar transceiver, such as electronic device 200 or 400 FIG. 2 or FIG. 4. Specifically, this disclosure provides the following four scenarios associated with dynamic gesture input:

Scenario 1: The hand approaches the electronic device from a far distance, performs the gesture, and moves away from the electronic device.

Scenario 2: The hand is stationary near the electronic device, performs the gesture, and moves away from the device.

Scenario 3: The hand approaches the electronic device from a far distance, performs the gesture, and stays stationary near the electronic device.

Scenario 4: The hand is stationary near the electronic device, performs the gesture, and becomes stationary again near the electronic device.

FIG. 5A illustrates a TVD 500 of a first scenario ("Scenario 1") in which the hand of the user approaches the electronic device, performs a double-pinch gesture, and moves away from the electronic device. In a TVD, the x-axis represents time measured in frame numbers (e.g., two seconds are illustrated as 50 frames), and the y-axis represents the velocity (e.g., in centimeters per second). That is, the Doppler dimension of the TVD is the velocity dimension represented by the y-axis.

The horizontal line 502 represents a target velocity of zero. Movement of an object toward the electronic device is detected as radar energy that is displayed above the horizontal line 502. Movement of an object away from the electronic device is detected as radar energy that is displayed beneath the horizontal line 502.

A data window 504 is a set of radar frames that includes a current frame and previous frames. The data window 504 includes a subset of "Hand Approaching" frames, a subset of "Gesture" frames, and a subset of "Hand Receding" frames. According to embodiments of this disclosure, "a gesture" refers to motions of a hand during the performance of a gesture defined in the gesture vocabulary 632, and a gesture is distinct from "an activity." An activity refers to hand approaching motion, hand moving away motion, or any random motion of the hand. Various examples of data windows in this disclosure include both a gesture and some activity. For example, the subset of gesture frames within the data window 504 is preceded and followed by activity, namely, the subset of "Hand Approaching" frames and the subset of "Hand Receding" frames.

A start 506 of an activity is illustrated as a red vertical line. The start 506 of the activity may or may not coincide with a prediction output by a binary classifier (e.g., binary classifier 622 of FIG. 6), depending on whether the prediction output by the binary classifier is preceded by an activity.

A ground truth ending 508 of the gesture is marked (illustrated as a red vertical line), for example, marked by a user of a training system or an engineer who is training the binary classifier. That is, the user actually completed performance of the gesture at the radar frame marked as the ground truth ending 508, but the ADM (e.g., ADM 620 of FIG. 6) did not detect the end of the gesture due to continuation of detecting activity of the hand receding, as shown by the subset of "Hand Receding" frames. The ground truth endings 508, 518, and 528 are marked based on visual observations in FIGS. 5A-5C, respectively. The start 506 and the ground truth ending 508 are a pair corresponding a first frame and a last frame among the set of frames containing the gesture. Again, the binary classifier 622 may or may not declare the end of the activity, depending on whether the prediction output by the binary classifier is preceded by an activity. Accordingly, the ground truth ending 508 of the gesture may or may not coincide with a prediction output by the binary classifier 622.

FIG. 5B illustrates a TVD 510 of a second scenario ("Scenario 2") in which the hand of the user is near the electronic device at the start of the gesture recognition mode, performs a double-pinch gesture, and moves away from the electronic device. The data window 514 includes a subset of "Hand already in proximity" frames, a subset of "Gesture" frames, and a subset of "Hand Receding" frames. A start 516 of an activity is illustrated as a red vertical line that corresponds to a frame before activity starts. In this example data window 514, the binary classifier may not output a prediction because activity frames do not precede the start 516. Again, the user actually completed performance of the gesture at the radar frame marked as the ground truth ending 518, but the ADM did not detect the end of the activity due to continuation of detecting activity in the subset of "Hand Receding" frames.

FIG. 5C illustrates a TVD 520 of a third scenario ("Scenario 3") in which the hand of the user approaches the electronic device, performs a double-pinch gesture, and remains near the electronic device with small finger shaking/perturbations after completing performance of the gesture. The data window 524 includes a subset of "Hand Approaching" frames, the subset of "Gesture" frames, and the subset of "Hand Static" frames. A start 526 of an activity is shown before (e.g., two radar frames before) the user actually starts performance of the gesture, but after the hand arrived in proximity to the electronic device. Again, the user actually completed performance of the gesture at the radar frame marked as the ground truth ending 518, but the ADM did not detect the end of the activity due to continuation of detecting activity in the subset of "Hand Receding" frames.

Although not illustrated as a separate drawing, this disclosure describes a fourth scenario ("Scenario 4") in which the hand of the user is stationary and exhibiting small finger shaking/perturbations near the electronic device at the start of the gesture recognition mode, starts performance of a gesture, and then becomes stationary again after completing performance of the gesture. In Scenario 4, the data window includes an initial subset of "Hand Static" frames, followed by a subset of "Gesture" frames, and a second subset of "Hand Static" frames.

Figure 6:
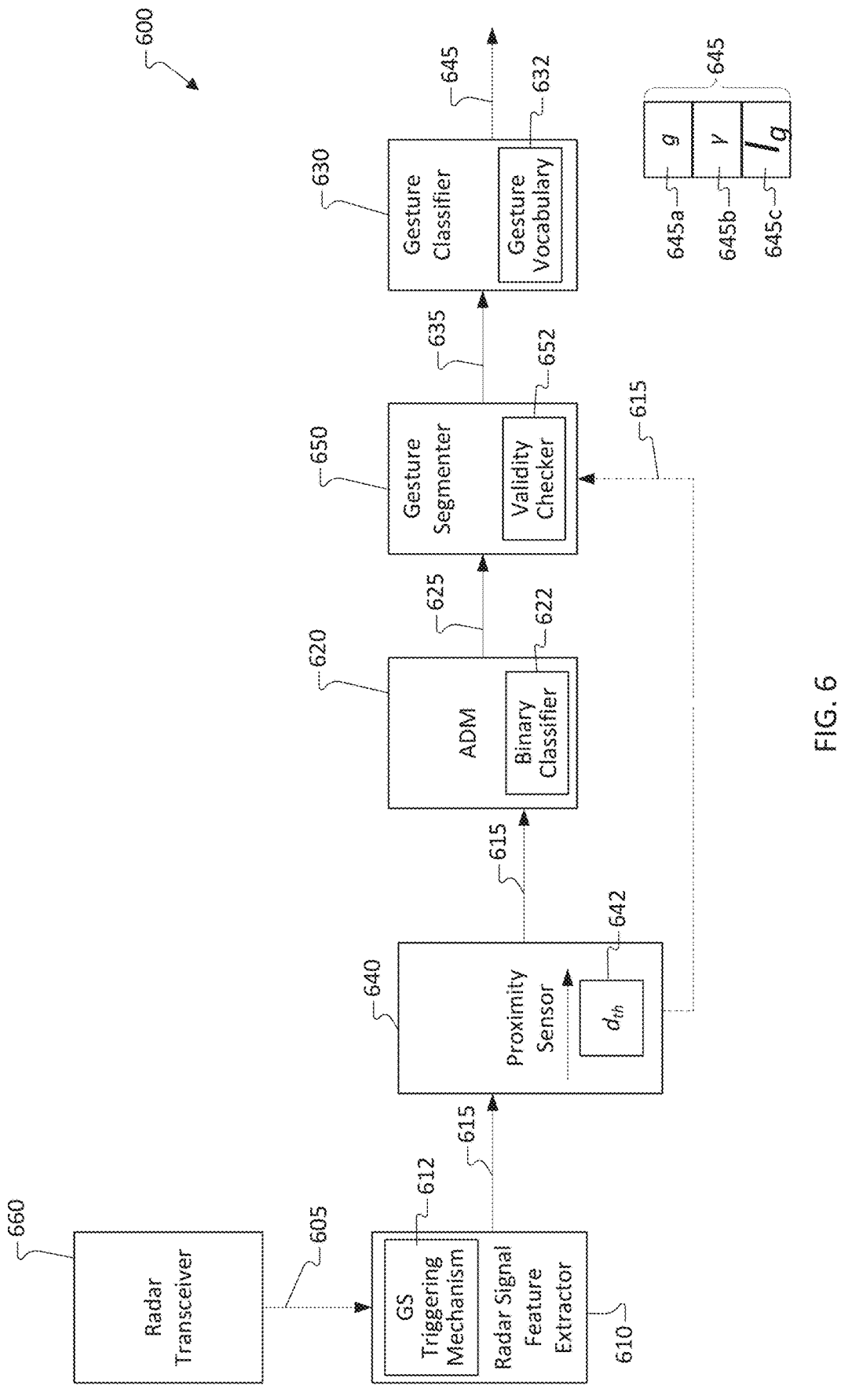
FIG. 6 illustrates a radar-based end-to-end gesture recognition system in accordance with an embodiment of this disclosure.

FIG. 6 illustrates a radar-based end-to-end gesture recognition system 600 in accordance with an embodiment of this disclosure. The embodiment of the system 600 shown in FIG. 6 is for illustration only, and other embodiments can be used without departing from the scope of this disclosure.

The end-to-end gesture recognition system 600 can be used to recognize a dynamic micro-gesture. The end-to-end gesture recognition system 600 has a gesture detection mode, which can be in an ON state or an OFF state. The processing pipeline within the end-to-end gesture recognition system 600 includes a radar signal feature extractor ("feature extractor") 610. In certain embodiments, the feature extractor 610 includes a gesture mode triggering mechanism 612 that, when triggered, activates the gesture detection mode into the ON state. The processing pipeline within the end-to-end gesture recognition system 600 processes raw radar data 605 when the gesture detection mode is in the ON state. The processing pipeline within the end-to-end gesture recognition system 600 includes an activity detection module (ADM) 620 that includes a binary classifier 622, and a gesture classifier (GC) 630 that includes a gesture vocabulary 632, a proximity detection module (PDM) 640 that determines a dynamic distance threshold ($d_{th}$) 642, and a gesture segmenter (GS) that includes a validity checker 652.

The end-to-end gesture recognition system 600 provides multiple technical solutions. One of the technical solutions is a velocity-based ADM 620 that determines the end of activity specific to Scenarios 3 and 4. In certain embodiments, the ADM 620 operates based on energy-based burst detection.

Another technical solution of the system 600 is to identify the distance from the electronic device to the location of the object (e.g., hand or finger of the user) where the gesture is being performed. This identified distance (e.g., determined by the PDM 640) enables the system to determine the $d_{th}$ 642. After performing the gesture, once the user's hand has moved away beyond the threshold distance $d_{th}$, such as in Scenarios 1 and 2, the system 600 immediately operates the GS 650 to check for a valid gesture instead of waiting for the ADM 620 to determine the end of activity, thereby reducing latency.

A third technical solution of the system 600 is the GS 650 that is triggered either when the user's hand has moved beyond the threshold distance $d_{th}$ or the ADM 620 has detected the end of activity. For implementing the GS 650, embodiments of disclosure include a rule-based method that takes into account the average speed and the distance of the object (i.e., finger or first of the user) over a sliding window of time past in order to identify a continuous time segment that likely contains the gesture.

In the processing pipeline of the system 600, once the gesture mode is triggered, the system 600 obtains (e.g., retrieves or receives) raw radar data 605 as input from the radar transceiver 660. The radar transceiver 660 can be the same as or similar to the radar transceiver 270 of FIG. 2 or the radar 400 of FIG. 4.

The incoming raw radar data 605 is first processed by the feature extractor 610 (including a signal processing module) to extract features 615 including Time-velocity data (TVD) and/or Time-angle data (TAD). The TVD and TAD can be presented or displayed as time-velocity diagram and time-angle diagram, respectively. In the case of TAD, the angular spectrum can be presented as a graph in which the x-axis represents power (in dB), and the y-axis represents the angle $\theta$ (in degrees). The extracted features 615 are referred to as radar data, but distinct from the raw radar data 605.

The PDM 640 obtains the extracted features 615 from the feature extractor 610, determines that determines a dynamic distance threshold ($d_{th}$) 642 based on the extracted features 615. The purpose of the PDM 640 is to monitor the target distance R to make sure that the target remains within a range of distances where a user is expected to perform a gesture, such as within the first area 120 of FIG. 1. Particularly, the PDM 640 determines whether the target distance satisfies a first proximity condition, which is defined based on the $d_{th}$ 642. The first proximity condition is not satisfied ($R>d_{th}$ is FALSE) if the target distance is within the first area 120. The PDM 640 triggers the ADM 620 in response to a determination first proximity condition is not satisfied, such as when the hand is in the first area 120 of FIG. 1. In certain embodiments, the PDM 640 triggers the ADM 620 by providing the extracted features 615 to the ADM 620, or enabling the ADM 620 to obtain the extracted features 615.

Alternatively, the first proximity condition is satisfied ($R>d_{th}$ is TRUE) if the target distance R is outside the first area 120, such as when the location of the target is too far away for the system 600 to accurately recognize a gesture performed. The PDM 640 triggers the GS 650 in response to a determination first proximity condition is satisfied. In certain embodiments, the PDM 640 triggers the GS 650 by providing the extracted features 615 to the GS 650, or enabling the GS 650 to obtain the extracted features 615.

The ADM 620 obtains the extracted features 615. The purpose of the ADM 620 is to determine the end of activity. In a scenario in which performance of a gesture is followed (for example, immediately followed) by non-activity, the ADM 620 is able to determine the end of gesture activity. While the gesture recognition mode is activated, the ADM 620 obtains radar data (e.g., receives extracted features 615 from the feature extractor 610), determines whether the obtained radar data includes gesture activity, and further determines an end of a gesture (e.g., end of gesture activity). Particularly, the ADM 620 determines a portion of the extracted features 615 containing the gesture ("gesture data") 625, which is the portion from a start of the gesture through an end of the gesture. The ADM 620 outputs the gesture data 625 to the GS 650, which discards non-gesture frames from the gesture data 625.

To determine whether the extracted features 615 (e.g., a current frame) includes an end of a gesture, the ADM 620 executes the binary classifier 622 function of generating a prediction that is an indicator of "class 1" if the extracted features 615 includes an end of a gesture or an indicator of "class 0" if the extracted features 615 does not include an end of a gesture. In certain embodiments, ADM 620 includes a binary classifier 622 that is able to generate a prediction indicating whether the extracted features 615 (e.g., a current frame) include a start of a gesture.

The GS 650 obtains gesture data 625 from the ADM 620 and obtains extracted features 615 from the PDM 640. Various conditions can trigger the GS 650 to operate. As one example, the GS 650 is triggered by receiving the gesture data 625 when the end of a gesture is detected by the ADM 620. As another example, the GS 650 is triggered when a first proximity condition is satisfied, such as when the hand of the user exits a range of distances where the hand of the user is expected to perform a gesture, such as when the hand recedes out of the first area 120 of FIG. 1. The purpose of the GS 650 is to separate gesture frames from non-gesture frames in the case of different scenarios. The GS 650 modifies the gesture data 625 by discarding the non-gesture frames, and outputs modified gesture data 635. Additional details of the GS 650 are described further below.

The GC 630 is triggered obtaining (for example, receiving) modified gesture data 635 from the GS 650. The GC 630 determines which specific gesture, out of a set of predetermined gestures that are collectively referred to as "gesture vocabulary" 632, is performed. That is, GC 630 identifies or recognizes the gesture performed by the user based on the TVD and/or TAD within the modified gesture data 635 received. The output 645 from the GC 630 includes a predicted gesture type 645a, a prediction confidence value 645b of the GC, a derived gesture length 645c, and so forth.

As an example only, the gesture vocabulary 632 can be a set of predetermined gestures that includes three pairs of dynamic micro-gestures, namely, total six gestures. The gesture vocabulary 632 can include a pair of circles, a pair of pinches, and a pair of swipes. The pair of circles contains a radial circle gesture and a tangential circle. The names radial and tangential come from the movement of the finger relative to the radar. As the name implies in the radial circle gesture, the movement of the finger is radial to the radar, whereas in the tangential circle gesture, the movement is tangential to the radar. The pair of pinches includes a single-pinch gesture and a double-pinch gesture. The pair of swipes includes two directional swipes, including a left-to-right swipe gesture and a right-to-left swipe gesture.

The system 600 outputs an event indicator indicating that a user of the electronic device performed the gesture classified by the GC 630. In some embodiments of the system 600, the event indicator is output by the GC 630, and accordingly, the output 645 is the event indicator. Outputting the event indicator is also referred to as reporting a gesture to applications, for example, reporting to a second application among the applications 262 of FIG. 2, such as a multimedia player application or virtual personal assistant application.

Although FIG. 6 illustrates one example radar-based end-to-end gesture recognition system 600, various changes can be made to FIG. 6. For example, various components in FIG. 6 can be combined, further subdivided, or omitted and additional components can be added according to particular needs. As another example, the system 600 is described for a gesture recognition use case, however, embodiments of this disclosure can be used for other uses cases other than gesture recognition, including but not limited to: sensing based maximum permissible exposure (MPE) management; proximity sensing; gesture recognition; liveness detection; sleep monitoring; and vital sign monitoring (breathing/heart rate detection). The system 600 is described with respect to mmWave radar, however, embodiments of this disclosure can be used with other types of radar modalities, other than mmWave radar. Commercialization of mmWave radar sensing on consumer devices is an emerging industry trend.

As another technical solution, embodiments of this disclosure are not limited to facilitating a micro-gesture recognition application (e.g., among applications 262 of FIG. 2) to the gesture recognition system 600, and the system 600 can be appropriately modified for facilitating various ambience-sensing applications. One of such ambience-sensing applications is waking up a smart home appliance such as the refrigerator or television based on a human approaching the appliance. Instead of performing a micro-gesture, in such scenarios, a person may perform a macro-gesture to give certain command and then move away from the device. A part of the technical solutions presented in this disclosure could be modified to enhance the user experience for such ambience-sensing applications. For these other uses cases, other than micro-gesture recognition, the parts of the system 600 can be enhanced for scenarios in which a person performs a macro-gesture to give certain command (e.g., perform a macro-gesture) and then moves away from the smart home appliance (e.g., refrigerator or TV). That is parts of the system 600 presented in this disclosure could be modified to enhance the user experience.

Figure 7:
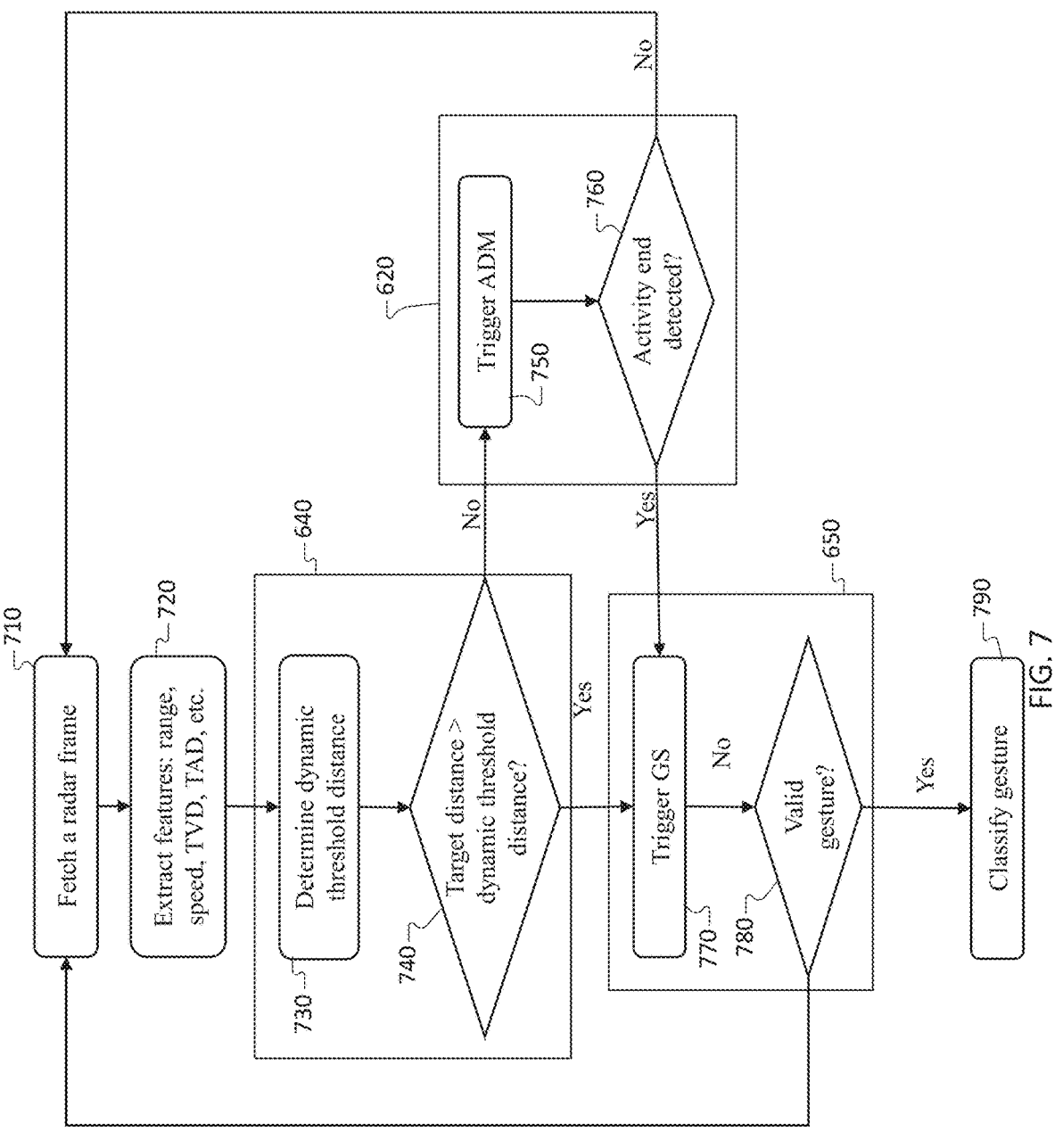
FIG. 7 illustrates a method for enabling dynamic gesture input for micro-gesture recognition in accordance with an embodiment of this disclosure.

FIG. 7 illustrates a method 700 for enabling dynamic gesture input for micro-gesture recognition in accordance with an embodiment of this disclosure. The embodiment of the method 700 shown in FIG. 7 is for illustration only, and other embodiments could be used without departing from the scope of this disclosure. The method 700 is performed by the system 600 of FIG. 6. However, it is understood that the method is performed by a processor 240 of the electronic device 200 executing the applications 262.

To identify the target object (e.g., the first and/or finger of a user), a sequence of frames is transmitted from the radar, wherein a frame includes a set of radar pulses. At block 710, the feature extractor 610 retrieves a radar frame from the radar transceiver 660. At block 720, using the received data corresponding to a frame, the feature extractor 610 extracts important features 615 related to the target such as distance, speed, TVD, TAD, etc.

The procedures at blocks 730 and 740 are performed by the PDM 640, which is represented by a block encircling blocks 730 and 740, for ease of explanation. At block 730, a dynamic threshold distance $d_{th}$ is determined. In certain embodiments, the $d_{th}$ is determined based on where the gesture is being performed. At block 740, using the extracted features 615, the PDM 640 determines whether the target is in proximity to the electronic device by determining whether. If the target is in the proximity (e.g., R>$d_{th}$ is FALSE), then the ADM 620 is triggered to detect a possible end of the gesture, at block 750. This determination at block 740 is helpful to reduce latency associated with detecting the end of the gesture corresponding to the Scenario 3 and Scenario 4, in which a hand stays stationary near the electronic device after performance of the gesture is completed.

The procedures at blocks 750 and 760 are performed by the ADM 620, which is represented by a block encircling blocks 750 and 760, for ease of explanation. At block 750, the ADM 620 is triggered to process one or more radar frames within the extracted features 615. At block 760, the ADM 620 determines whether an end of a gesture is detected. Once the gesture end is detected, the GS is triggered at block 770. Conversely, if the target is not in the proximity (e.g., R>$d_{th}$ is TRUE) relative to the electronic device, such as if the target has moved away, then the GS 650 is triggered to reduce latency, at block 770. This determination at block 760 is helpful in detecting the end of gesture corresponding to Scenario 1 and Scenario 2, in which the hand has moved away from the electronic device after performing the gesture.

The procedures at blocks 770 and 780 are performed by the GS 650, which is represented by a block encircling blocks 770 and 780, for ease of explanation. Once triggered at block 770, the function of the GS 650 is to remove non-gesture frames, which are radar frames that correspond to the hand approaching the electronic device (such as before starting performance of a gesture) and/or moving away from the electronic device (such as after completing performance of the gesture).

At block 780, after the GS 650 has identified the frames that correspond to the gesture, an additional check is performed to determine if the frames contain a valid gesture. Particularly at block 780, the GS 650 determines the number of active frames that are in the set of frames output by the GS 650. The GS 650 compares the determined number of active frames to predefined threshold, which depends on the length of the smallest gestures in our vocabulary. If the number of active frames exceeds the predefined threshold, GS 650 determines that the frames contain a valid gesture. In response to the determination that the frames contain a valid gesture, GS 650 triggers the GC 630 to perform prediction of the gesture, at block 790.

Although FIG. 7 illustrates one example method 700 for enabling dynamic gesture input for micro-gesture recognition, various changes can be made to FIG. 7. For example, various components in FIG. 7 can be combined, further subdivided, or omitted and additional components can be added according to particular needs. As a particular example, the PDM 640 continues to operate at blocks 730 and 740 concurrently while the procedures of blocks 750 and 76 are performed by the ADM. As such, even during the middle of performance of a gesture, the PDM 640 continues monitoring the target's distance to check that target remains within a range where performance of the gesture is valid, and triggers the GS 650 in response to a determination that the target object has receded far enough to satisfy the first proximity condition.

Figures 8A, 8B, 8C:
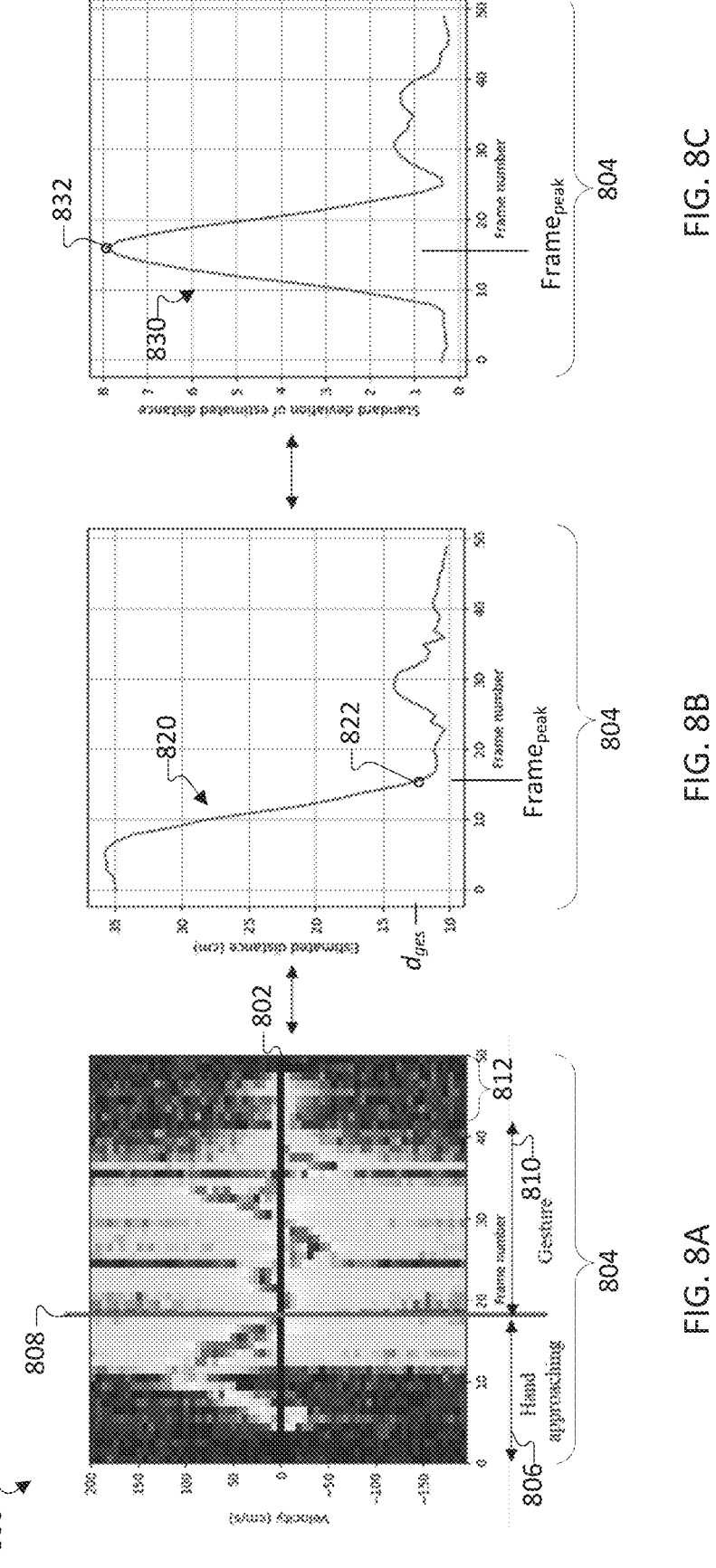
FIGS. 8A, 8B, and 8C illustrate various examples of extracted features that are extracted from raw radar data in accordance with an embodiment of this disclosure.

FIGS. 8A, 8B, and 8C illustrate various examples of extracted features that are extracted from raw radar data in accordance with an embodiment of this disclosure. The embodiments of the extracted features shown in FIGS. 8A, 8B, and 8C are for illustration only, and other embodiments could be used without departing from the scope of this disclosure. As an example, the extracted features 615 of FIG. 6 can include the TVD 800 of FIG. 8A. That is, the extracted features shown in FIGS. 8A, 8B, and 8C help to describe the methods to extract the features (e.g., extracted features 615 of FIG. 6) that are relevant to the technical solutions provided by embodiments of this disclosure. Further, the extracted features shown in FIGS. 8A, 8B, and 8C help to describe how the system 600 determines the dynamic threshold distance 642.

FIG. 8A illustrates a TVD 800 in accordance with an embodiment of this disclosure. The TVD 800, horizontal line 802, and data window 804 of FIG. 8 are similar to corresponding components 520, 502, and 524 of FIG. 5C. The data window 804 includes a subset of "Hand Approaching" frames 806 before the user starts performance of a gesture, a start 808 of the gesture (illustrated as a red vertical line overlapping the TVD 800) determined by the system 600, a subset of "Gesture" frames 810 representing performance of the gesture by the user, and another subset of frames 812 following the gesture frames 810. The "Hand Approaching" frames 806 indicate that the TVD 800 can correspond to Scenario 1 and Scenario 3. In this example, the subset of frames 812 are similar to the "Hand Static" frames of FIG. 5C that follow the end of the gesture, and are described as corresponding to Scenario 3.

As part of performing feature extraction methods, the feature extractor 610 ascertains that a radar frame includes $N_c$ number of pulses, wherein each radar pulse provides one measurement of the channel impulse response (CIR), which includes $N_s$ delay bins (or equivalently range bin). The feature extractor 610 obtains a Range-Doppler map (RDM) that can be defined according to Equation 10, where $N_s$ represent the number of delay bins.

$$R_M \in C^{N_c \times N_s} \tag{10}$$

The feature extractor 610 obtains power in each bin of the RDM by first applying the discrete Fourier transform (DFT) across pulses. Next, the feature extractor 610 will stack the transformed output of the pulses, and apply the DFT across each range bin. In a final step, the feature extractor 610 computes the power for each bin by computing the square of the absolute value of the complex number on each bin. Another intermediate quantity of interest that is derived from the RDM is the range profile, which can be defined according to Equation 11 and Equation 12.

$$r_p \in R^{N_s} \tag{11}$$

$$r_p[j] = \sum_{i=1}^{N_c} R_M[i, j] = 1, 2, \ldots, N_s \tag{12}$$

From the RDM and range profile, feature extractor 610 estimates various features of interest such as target distance, velocity, speed, etc. To estimate the target distance, the feature extractor 610 is configured to assume that the target distance is directly proportional to the maximum peak of the range profile $r_p$. The target distance is estimated by the following Equation 13, where the maximum peak is located at the n-th range bin, $C_d$ is the distance resolution, n is an index of a range bin, and k represents the index of summation over the desired range bins.

$$d_{est} = C_d \frac{1}{\sum_{k=max(0,n-1)}^{min(n+1,N_S)}} r_P[k] \sum_{k=max(0,n-1)}^{min(n+1,N_S)} k \; r_p[k] \tag{13}$$

The distance can also be estimated using appropriate interpolation method such as sinc or successive parabolic interpolation. For example, if the peak is located at the n-th range bin, then the sinc or parabolic functions could be used along with the range profile values between the range bin n−1 to n+1 to estimate the target distance.

Further, to estimate the velocity, the feature extractor 610 uses the information embedded in the n-th column of $R_M$. In order to avoid any undesirable perturbation in the estimate due to noise, the feature extractor 610 will first set the elements in $R_M[: , n]$, which represents the n-th column of $R_M$, that are below the noise threshold $T_{noise}$ to zero, as shown in Equation 14.

$$R_M[r, n] = \begin{cases} R_M[r, n], & \text{if } R_M[r, n] > T_{noise} \\ 0, & \text{if } R_M[r, n] \leq T_{noise}. \end{cases} \tag{14}$$

The average estimated speed can be expressed according to Equation 15, where $C_v$ is the Doppler velocity resolution.

$$s_{est} = C_v \frac{1}{\sum_{r=-\frac{N_C}{2}-1}^{\frac{N_C}{2}} R_M[r, n]} \sum_{r=-\frac{N_C}{2}-1}^{\frac{N_C}{2}} |r| R_M[r, n] \tag{15}$$

Similarly, the average estimated velocity can be expressed according to Equation 16.

$$v_{est} = C_v \frac{1}{\sum_{r=-\frac{N_C}{2}-1}^{\frac{N_C}{2}} R_M[r, n]} \sum_{r=-\frac{N_C}{2}-1}^{\frac{N_C}{2}} r \; R_M[r, n] \tag{16}$$

The estimated distance, speed, and velocity are stored in the memory for past $n_M$ frames that may be later used by the subsequent functional blocks such as PDM 640, ADM 620, and GS 650.

FIG. 8B illustrates the estimated target distance 820 extracted from the TVD of FIG. 8A. As part of performing feature extraction methods, the feature extractor 610 implements the process for proximity detection of the target, of which the target distance 820 is an outcome. The x-axis represents time measured in frame numbers, and the y-axis represents the estimated distance (e.g., in centimeters) from the electronic device to the target. In this example, "Hand Approaching" frames 806 include a short period of time during which the estimated target distance 820 drops from greater than 35 cm down to less than 15 cm. The "Gesture" frames 810 include a period of time during which the hand of the user remains within a span that is between 10 cm and 15 cm away from the radar. The subset of frames 812 that follow the end of the gesture include a period of time during which the estimated target distance 820 approximately reduces from 11.5 cm to 10 cm, indicating that the hand of the user moves away from the radar by approximately only 1.5 cm.

FIG. 8C illustrates a standard deviation (a) 830 of the estimated target distance 820 of FIG. 8B based on a look-back window of last $n^r$ frames. In this non-limiting example, the lookback window includes $n_r=10$ frames, including the current frame and 9 previous frames. The x-axis represents time measured in frame numbers, and the y-axis represents the standard deviation of the estimated distance from the electronic device to the target. For each frame in FIGS. 8A-8C, the standard deviation 830 of the estimated distance 820 is computed over the last $n_r=10$ frames, as expressed according to Equation 17.

$$d_{sd}[f] = sd(d[f - 10:f])$$ (17)

Within the curve representing the standard deviation 830, the first peak 832 indicates that the approach of the user's hand toward the electronic device has ended and that the user is ready to perform a gesture. The frame that corresponds to the first peak 832, which frame is illustrated as $\text{Frame}_{peak}$, is an estimate of the time at which the user starts to perform a gesture. Referring back to FIG. 8B, the PDM 640 identifies the point 822 on the estimated distance 820 curve that has the x-axis value of the frame $\text{Frame}_{peak}$, and this point 822 has a y-axis value referred to as a distance $d_{ges}$ at which the user is about to start a performance of a gesture. The frame $\text{Frame}_{peak}$ is also referred to as an "end-of-approach" frame. The distance $d_{ges}$ is also an approximation of the location where the hand of the user remains during the performance of the gesture. More particularly, the first of the hand might remain stationary at the distance $d_{ges}$ while the fingers of that hand move during the performance of the gesture.

For all four scenarios, the PDM 640 determines the distance $d_{ges}$ that is related to the point in time at which performance of a gesture is imminent. (e.g., median) of the estimated distance 820 of the last $n_r$ frames. A first method of determining the distance $d_{ges}$ is executed for Scenarios 2 and 4, and a different second method of determining the distance $d_{ges}$ is executed for Scenarios 1 and 3.

For Scenarios 2 and 4, in which the user's hand is already near the electronic device prior to starting performance of the gesture, the PDM 640 sets the distance $d_{ges}$ as the average (e.g., mean or median) of the estimated distance 820 over the past few frames (e.g., the last $n_r$ frames including the current frame). Any other point estimate for $d_{ges}$ may also be used that efficiently takes scenario specific statistics into account.

For Scenarios 1 and 3, in which the user's hand is in motion and approaching the device prior to starting performance of the gesture, the PDM 640 is configured sets the distance $d_{ges}$ based on an observation that the standard deviation 830 of the estimated distance 820 over past few frames (e.g., the last $n_r$) is likely to peak 832 when the user's hand has completed the "approach" to the electronic device.

Both of these first and second methods of determining the $d_{ges}$ are described further below with FIG. 9. In case of scenarios 2 and 4, wherein the hand is already in proximity to the electronic device at the beginning of the data window, the standard deviation 830 of the estimated distance 820 over past few frames ($-n_f$ in flowchart) is likely to be small. Hence, the PDM 640 can set the distance $d_{ges}$ according to Equation 18, where $\sigma_{i\_sd}$ is a design parameter and depends on the Doppler profile of the gestures in the gesture vocabulary 632. The target distance in the most recent frame is represented as d[0], which is in vector format.

$$d_{ges} = \text{average}(d[-n_f:0])$$ (18)
$$\text{if } d_{sd}[-n_f:0] < \sigma_{i\_sd}$$

Alternatively, still in the case of Scenarios 2 and 4, the PDM 640 can set the distance $d_{ges}$ according to Equation 19.

$$d_{ges} = \text{median}(d[-n_f:0])$$ (19)
$$\text{if } d_{sd}[-n_f:0] < \sigma_{i\_sd}$$

In contrast, if $d_{sd}[-n_f:0] > \sigma_{i\_sd}$, then the PDM 640 can check for peaks in $d_{sd}$ over last few frames, and accordingly select the "end-of-approach" frame, and set $d_{ges}$ equal to the target distance at the end-of-approach frame.

Figure 9:
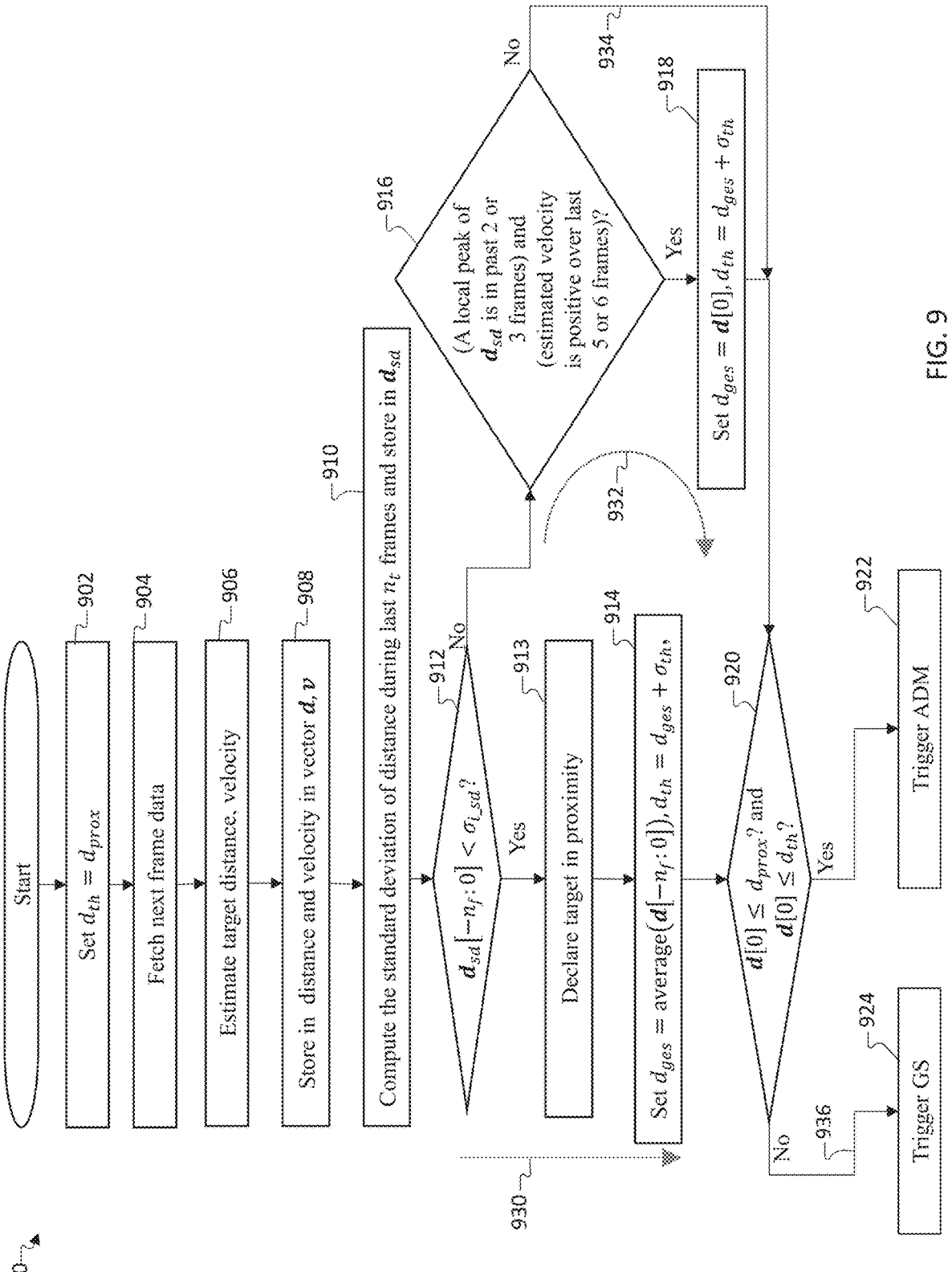
FIG. 9 illustrates a method for proximity detection in accordance with an embodiment of this disclosure.

FIG. 9 illustrates a method 900 for proximity detection in accordance with an embodiment of this disclosure. The embodiment of the method 900 shown in FIG. 9 is for illustration only, and other embodiments could be used without departing from the scope of this disclosure. The method 900 is described as being performed by the system 600 of FIG. 6, for ease of explanation. However, it is understood that the method is performed by a processor 240 of the electronic device 200 executing the applications 262.

At the start of the method 900, the system 600 has received raw radar data of a current radar frame. At the end of the method 900, either the ADM 620 or the GS 650 is triggered.

At block 902, the $d_{th}$ is set. In some embodiments, the PDM 640 sets the dynamic threshold distance 642 to the value of a predefined proximity distance $d_{prox}$.

At block 904, the procedure of obtaining radar data of a next radar frame can be the same as or similar to the procedure performed at block 710 of FIG. 7. At block 906, the feature extractor 610 extracts features from the latest radar frame, including estimating a target distance and velocity of the target. For example, FIG. 8B shows the estimated target distance 820 corresponding to each radar frame in the data window 804. At block 908, the system 600 stores the estimated target distance and the velocity of the target in vector format, as d and v respectively.

At block 910, the feature extractor 610 extracts additional features corresponding to latest radar frame and stores the additional features in vector format. Particularly, the feature extractor 610 computes the standard deviation of the estimated target distance during the last $n^r$ frames, and stores the standard deviation as the vector $d_{sd}$. The last $n_r$ frames includes the latest radar frame and $n_r-1$ previous frames. As an example, for each radar frame in the data window 804 of FIG. 8C, standard deviation 830 of the estimated target distance 820 during the last $n_r=10$ frames is shown.

Blocks 912 through 914 represent an algorithm (illustrated as the arrow 930) that sets the $d_{th}$ 642 based on the gesture distance or the resting first within the proximity distance $d_{prox}$. At block 912, the system 600 determines whether the standard deviation over a lookback window ($d_{sd}[-n_f:0]$) is less than a design parameter $\sigma_{i\_sd}$. For example, the system 600 can determine whether the standard deviation 830 of FIG. 8 at any particular time (as indicated by frame number) is less than the $\sigma_{i\_sd}$.

In certain embodiments, the method 900 includes block 913 at which, in response to a determination that $d_{sd}[-n_f:0] < \sigma_{i\_sd}$ is TRUE, the system 600 declares that the target is in proximity to the electronic device. At block 914, in response to a determination that $d_{sd}[-n_j:0]<\sigma_{i\_sd}$ is TRUE, the system 600 sets $d_{ges}$ according to the above-described Equations 18 or 19 and sets $d_{th}$ according to Equation (20).

$$d_{th} = d_{ges} + \sigma_{th} \qquad (20)$$

Blocks 916 and 918 represent an algorithm (illustrated as the arrow 932) that sets the $d_{th}$ 642 based on the approaching first in Scenario 1 and Scenario 3. At block 916, the system 600 determines whether a local peak of the vector $d_{sd}$ is in the latest $w_1$ frames, and determines whether the estimated velocity (e.g., vector v) is positive over the latest $w_2$ frames. In certain embodiments, $w_1$ is equal to 2 or 3, and $w_2$ is equal to 5 or 6. If a determination result is NO for any among these two conditions defined by $w_1$ and $w_2$, respectively, then the method proceeds to block 920. The arrow 934 from block 916 to block 920 represents an algorithm that is based on the hand receding or moving away from the electronic device.

At block 918, in response to a determination of YES for both of the conditions defined by $w_1$ and $w_2$, the system 600 sets $d_{ges}$ equal to d[0], which denotes the target distance in the most recent frame, as expressed in Equation 21. Also, the system 600 sets the dynamic threshold distance 642 according to the above described equation 20.

$$d_{ges} = d[0] \qquad (21)$$

To check whether the target is in the proximity, the PDM 640 uses the straightforward approach of comparing the target distance to the predefined proximity distance $d_{prox}$. Particularly, at block 920, the PDM determines whether the target distance d[0] in the most recent frame satisfies the above-described first proximity condition that is defined based on the $d_{th}$ 642 and satisfies an additional proximity condition that is defined based on the proximity distance $d_{prox}$. The first proximity condition is satisfied when $d[0] \leq d_{th}$ is FALSE. The additional proximity condition is satisfied when $d[0] \leq d_{prox}$ is TRUE. At block 922, the PDM 640 triggers the ADM 620 in response to a determination that $d[0] \leq d_{th}$ and $d[0] \leq d_{prox}$ are both TRUE (i.e., only the second proximity condition is satisfied). At block 924, the PDM 640 triggers the GS 650 in response to a determination that any among $d[0] \leq d_{th}$ and $d[0] \leq d_{prox}$ is FALSE (i.e., the first condition is satisfied, or the second proximity condition is not satisfied). The arrow 936 from block 920 to block 924 represents an algorithm that is based on the hand receding or moving away from the radar in Scenario 1 and Scenario 2.

The proximity distance $d_{prox}$ may be set to the maximum distance within which the user is allowed to perform a gesture, in other words, the predefined proximity distance $d_{prox}$ is a design parameter used to define the range of distances within which performance of a gesture is valid. For example, if the gesture system 600 is configured such that gesture input is allowed within 30 cm from the radar, then proximity distance can be predefined as $d_{prox}$=35 cm. In this situation, after performing the gesture, once the hand has moved beyond 35 cm away from the electronic device, the PDM 640 can trigger the GS 650.

In an alternative situation, the hand performs the gesture near 15 cm from the radar, and after completing performance of the gesture, moves away from the radar to a distance d centimeters from the radar (where $15 \leq d \leq 30$) before becoming stationary. In this situation, a direct way of determining the gesture end is to wait for the ADM 620 to encounter a few non-active frames when the hand has moved away and becomes stationary.

In both of the aforementioned situations, a higher latency is expected between the time of the user performing the gesture and the time of the system 600 determining that the gesture has ended. To circumvent this issue of higher latency, the system 600 performs an additional check with respect to the dynamic threshold distance $d_{th}$. Because the system 600 is designed for finger level micro-gestures, the system 600 can be configured based on an observation that the distance of the finger from the radar is likely to be within a certain span (typically, 10-12 cm) while performing a gesture. The width of this span, as a design parameter, can be the maximum distance a finger can cover based on the gesture vocabulary 632, and the center of the span can be the approximate distance where the gesture is performed. Based on an observation that the user is likely to move the hand beyond this span (i.e., farther away from the radar) after performing the gesture, the system 600 is configured to trigger the GS 650 based on assuming that the gesture has ended when the finger recedes out of the span.

The aforementioned dynamic threshold distance $d_{th}$ could be selected as the farthest end point of this span from the radar, as expressed in Equation 22, where $d_{ges}$ represents the approximate distance where the gesture is likely to have been performed, and $\Delta_{th}$ is set to a little more than half of the possible window length. In the previously-described example, with perfect estimation $d_{ges}$=15 cm and $\Delta_{th}$ can be set to 5-6 cm, as the finger is not likely to move beyond this distance during the gesture, and as a result, $d_{th}$ can be set to 21 cm.

$$d_{th} = d_{ges} + \Delta_{th} \qquad (22)$$

Figure 10:
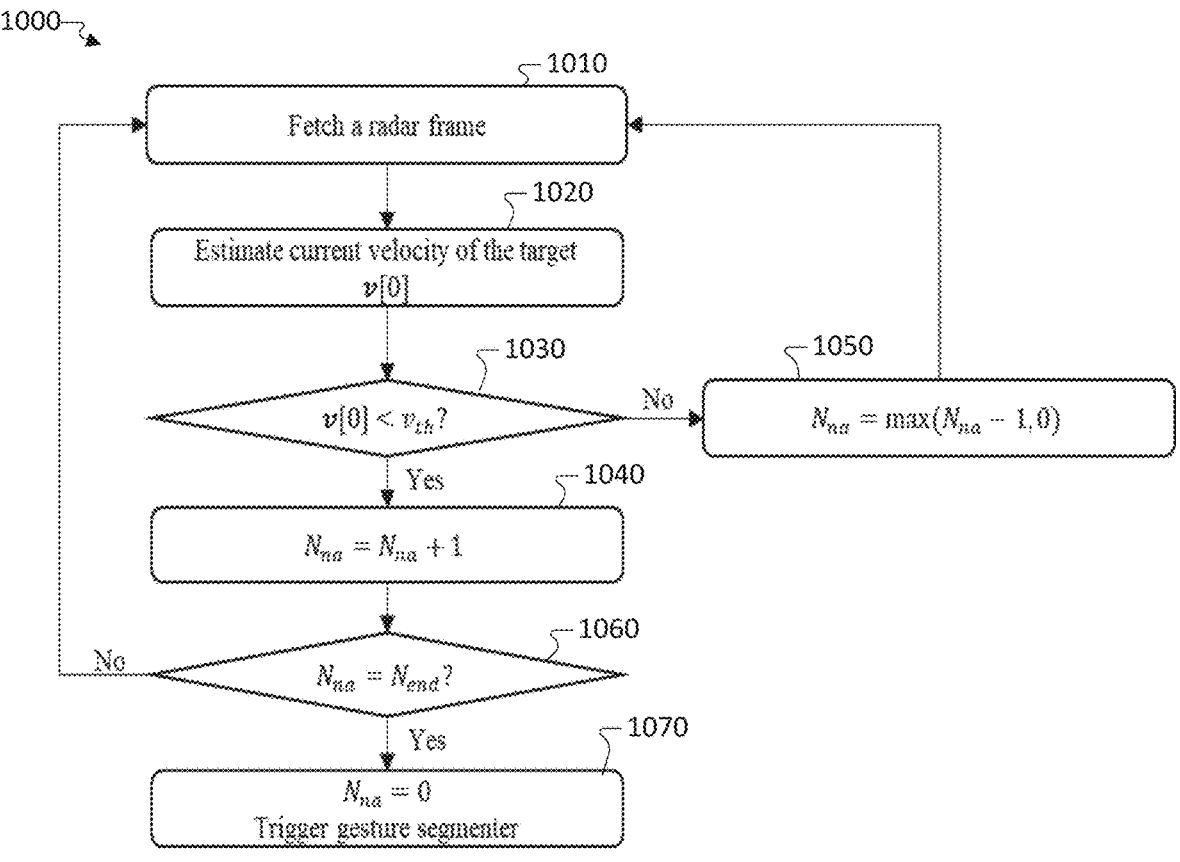
FIG. 10 illustrates a method for activity detection in accordance with an embodiment of this disclosure.

FIG. 10 illustrates a method 1000 for activity detection in accordance with an embodiment of this disclosure. The embodiment of the method 1000 shown in FIG. 10 is for illustration only, and other embodiments could be used without departing from the scope of this disclosure. The method 1000 is described as being performed by the system 600 of FIG. 6, for ease of explanation. However, it is understood that the method is performed by a processor 240 of the electronic device 200 executing the applications 262.

The method 1000 begins in response to a determination that the target object is in proximity to the radar of the electronic device 200. Once the hand is in proximity, the ADM 620 expects the user to perform a gesture. The function of the ADM 620 is to determine the end of the gesture in response to detecting or accumulating a specified number of non-active frames. Once the ADM 620 detects a specified number $N_{end}$ of non-active frames, the ADM 630 determines the gesture has ended. The process flow to declare the end of the gesture based on non-active frames is described more particularly below.

At block 1010, the procedure of obtaining radar data of a radar frame (e.g., a current radar frame) can be the same as or similar to the procedure performed at block 710 of FIG. 7. At block 1020, the procedure of extracting features from the latest radar frame can be the same as or similar to the procedure performed at block 720 of FIG. 7 or block 906 of FIG. 9. Particularly, the feature extractor 610 extracts features from the current radar frame, including estimating a current velocity of the target, which is denoted as v[0].

At block 1030, if for a current frame, the estimated velocity v[0] is less than a predefined velocity threshold $v_{th}$, then the ADM 620 determines the frame as non-active, and the method proceeds to block 1040. The threshold $v_{th}$ can be selected adaptively that may depend on the useful signal to clutter ratio. At block 1040, the non-active frame counter $N_{na}$, is increased at the frame the ADM 620 detects a non-active frame. On the other hand, in response to a determination that the estimated velocity v[0] is greater than or equal to the predefined velocity threshold $v_{th}$, the ADM 620 determines the current frame at an active frame, and the method proceeds to block 1050 for decrementing the non-active frame counter $N_{na}$. That is, at block 1050, for any active frames, this non-active frame counter is decreased until $N_{na}$ is equal to zero. At block 1060, the ADM 620 determines whether the incremented non-active frame counter $N_{na}$ is equal to the specified number $N_{end}$ of non-active frames. Once the counter $N_{na}$, reaches $N_{end}$, at block 1070, the ADM 620 resets $N_{na}$, to a zero value and triggers the GS 650.

Although FIG. 10 illustrates one example method 1000 for activity detection, various changes can be made to FIG. 10. For example, various components in FIG. 10 can be combined, further subdivided, or omitted and additional components can be added according to particular needs. The ADM 620 is not limited to using a velocity threshold with that is fixed. As a particular example, the ADM 620 can operate based on an indirect speed estimation metric. Such a metric may be computed from the RDM at the peak range index n. In this example, the ADM 620 can be configured based on an assumption that the elements corresponding to the 0-Doppler in the RDM have been nulled (i.e., set to a zero or a negligible value). The average Doppler energy (i.e., the same as used in the range profile) can be expressed by Equation (23), the power weighted Doppler (PWD) can be expressed by Equation (24), and the likes.

$$\text{avg. Doppler energy} = \frac{1}{N_c} \sum_{r=-\frac{N_C}{21}-1}^{\frac{N_C}{2}} R_M[r, n] \quad (23)$$

$$PWD = \frac{1}{N_c} \sum_{r=-\frac{N_C}{21}-1}^{\frac{N_C}{2}} r R_M[r, n] \quad (24)$$

These metrics (i.e., average Doppler energy and PWD) provide some indirect speed estimate because the amplitude of each element in the RDM after 0-Doppler nulling represents energy corresponding to non-zero Doppler (i.e., some non-zero speed). The method 1000 of FIG. 10 can be modified such that the velocity threshold $v_{th}$ may be replaced by the noise estimate (e.g., estimated from the RDM or the range profile by computing the median) if the average Doppler power metric is used. A similar metric may be computed for the PWD by first computing the PWD within a window of frames and computing the median of the range profile as the estimated noise.

Figure 11:
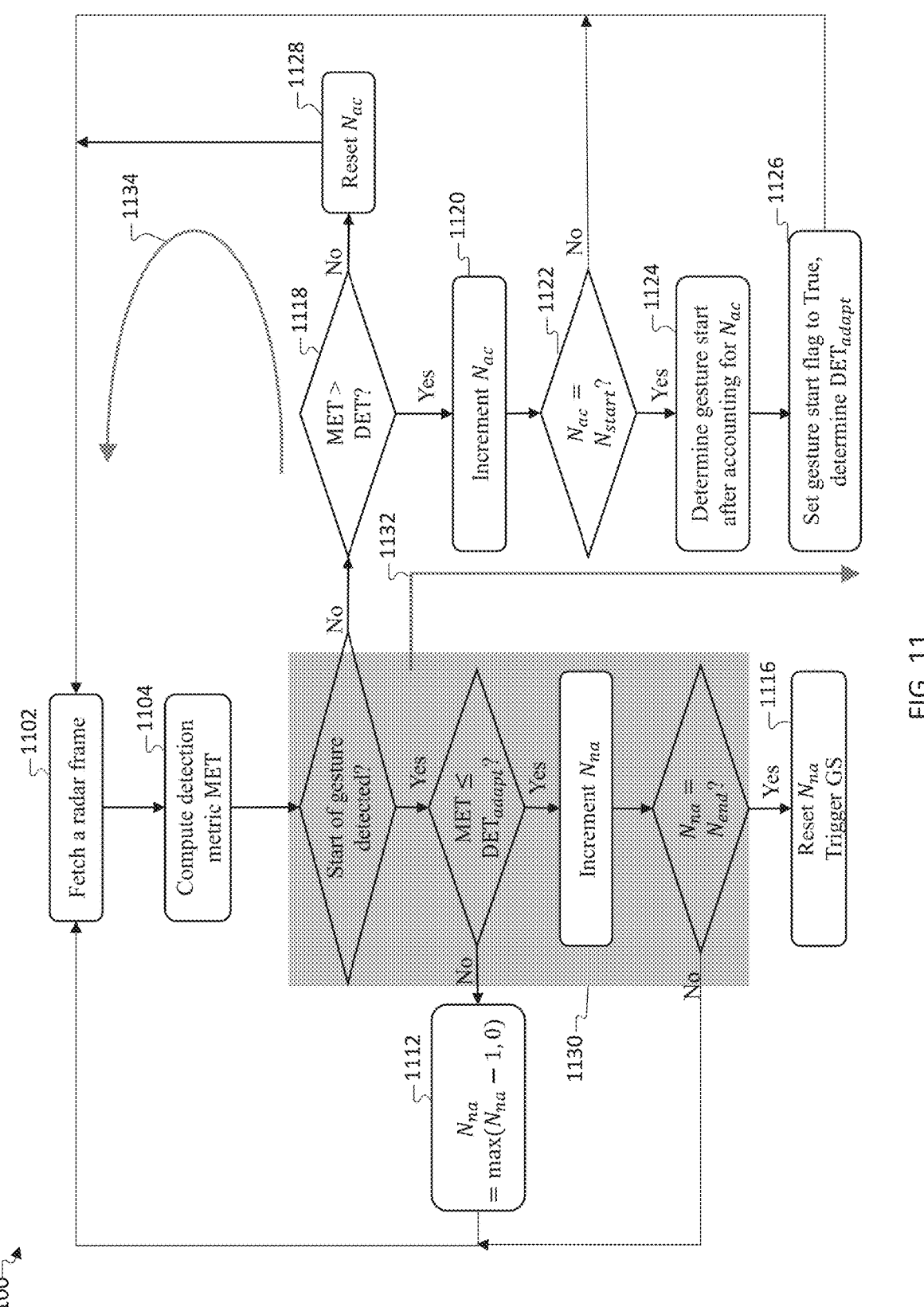
FIG. 11 illustrates a method for activity detection including gesture start detection and detection of an end of the gesture based on an adaptive threshold in accordance with an embodiment of this disclosure.

FIG. 11 illustrates a method 1100 for activity detection including gesture start detection and detection of an end of the gesture based on an adaptive threshold (DET$_{adapt}$) in accordance with an embodiment of this disclosure. The embodiment of the method 1100 shown in FIG. 11 is for illustration only, and other embodiments could be used without departing from the scope of this disclosure. The method 1100 is described as being performed by the system 600 of FIG. 6, for ease of explanation. However, it is understood that the method is performed by a processor 240 of the electronic device 200 executing the applications 262.

The method 1100 uses an adaptive metric threshold DET$_{adapt}$ for detecting the end of a gesture. DET denotes a detection/comparison threshold. A technical benefit of using the adaptive metric threshold DET$_{adapt}$ is combatting some clutter contribution (that would otherwise be present in the radar data) resulting from some shakiness of one or more of the fingers after the performance of the gesture motion has been completed. During the performance of the gesture motion, the speed of the fingers is likely to be higher than just the shaky fingers using the metric described herein. As such rather than based only on the noise estimate (or the corresponding one for PWD), the method 1100 enables the system 600 to adapt the threshold DET$_{adapt}$ based on the peak (or high) values of the metric from the start of the gestures. To adapt the threshold DET$_{adapt}$, the ADM 620 can be an MET-based ADM that is configured to first estimate the start of the activities. In some embodiments, the start of activities is also the start of the gesture. In this case, for the start of gesture detection, the MET-based ADM uses the threshold DET$_{adapt}$ based on the above-described noise (denoted as DET in FIG. 11) along with a count of the number of activity frames (e.g., could be consecutive frames count). An adaptive threshold DET$_{adapt}$ is then used for detecting the gesture end. The adaptive threshold DET$_{adapt}$ may be determined as according to Equation (25), where $N_{ac}$ denotes the number of frames from the detected start of the gesture, and $N_{start}$ denotes a lower limit (e.g., minimum) number of active frames to satisfy a gesture start condition. In some embodiments, the detection of an active frame is the start of the activities, and $N_{ac}$ represents an active frame counter. The MET-based ADM 620 detects an active frame based on determining the detection metric (MET) is greater than the adaptive threshold DET$_{adapt}$.

$$DET_{adapt} = \begin{cases} DET, & \text{if } N_{ac} < N_{start} \\ \text{median}(N_{th} \text{ highest met within } N_{ac}), & \text{if } N_{ac} \geq N_{start} \end{cases} \quad (25)$$

The method 1100 begins at block 1102. Block 1102 is the same as or similar procedure as block 1010 or FIG. 10.

At block 1104, the system 600 computes a detection metric (MET). Instead of average velocity as a detection metric, the MET-based ADM is able to utilize other metrics, such as average Doppler energy in a TVD frame, which are referred to as alternate metrics (MET). These alternate metrics are correlated to the velocity of the target.

At block 1106, the ADM 620 determines whether the start of a gesture is or has already been detected. In response to a determination that the gesture has started, the method 1100 proceeds to execute an algorithm of determining the end of the gesture, which is illustrated as the shaded grouping 1130 including from block 1106 through blocks 1108, 1110, and 1114. Conversely, in response to a determination that the gesture has not yet started, the method 1100 proceeds to execute an algorithm of dynamically determining the DET$_{adapt}$ and determining a start of a gesture, which algorithm is illustrated as the arrow 1132 from block 1106 through blocks 1118, 1120, 1122, 1124, and 1126.

At block 1108, the ADM 620 determines whether the MET exceeds the adaptive threshold DET$_{adapt}$. Particularly, in response to a determination that the MET is less than or equal to the adaptive threshold DET$_{adapt}$ (MET≤DET$_{adapt}$ is TRUE), the method 1100 proceeds to block 1110. In response to a determination that the MET is greater than the adaptive threshold $DET_{adapt}$ ($MET \leq DET_{adapt}$ is FALSE), the method 1100 proceeds to block 1112.

Block 1110 is the same as or similar procedure as block 1040 or FIG. 10. After incrementing the non-active frame counter $N_{na}$, the method proceeds to block 1114.

Block 1112 is the same as or similar procedure as block 1050 or FIG. 10. After decrementing the non-active frame counter $N_{na}$, the method returns to block 1102 to obtain radar data of the next frame.

Block 1114 is the same as or similar procedure as block 1060 or FIG. 10. Block 1116 is the same as or similar procedure as block 1070 or FIG. 10.

At block 1118, in response to a determination that the gesture has not yet started, the system 600 determines whether the MET exceeds a detection/comparison threshold DET. If MET is greater than DET, then the method proceeds to block 1120. If MET is not greater than DET, then the method proceeds to block 1128. That is, the procedure at block 1118 is analogous to the above-described procedure of block 1108, except block 1118 compares the MET the DET that has not yet been updated or adapted.

At block 1120, the ADM 620 increments the $N_{ac}$.

At block 1122, the ADM 620 determines whether the $N_{ac}$ is equal to the threshold number $N_{start}$. In response to a determination that $N_{ac}$ is equal to the $N_{start}$, the method proceeds to block 1124. If it is determined that $N_{ac}$ is not yet equal to the $N_{start}$, the method returns to block 1102.

At block 1124, the ADM 620 determines the start of the gesture after accounting for the $N_{ac}$, as incremented. In other words, the ADM 620 determines the current radar frame as the start of a gesture. As an example, FIG. 8A shows a gesture start 808, as determined automatically by the ADM 620.

At block 1126, the ADM 620 sets a gesture start flag to TRUE and determines the determines an adaptive threshold $DET_{adapt}$. In some implementations, determining the adaptive threshold $DET_{adapt}$ includes updating the $DET_{adapt}$. From block 1126, the method returns to block 1102.

At block 1128, the ADM 620 resets $N_{na}$, to a zero value, then the method returns to block 1102. The arrow 1134, which is from block 1118 through blocks 1128 and 1102, represents the system 600 making a determination that a gesture has not started.

Figure 12:
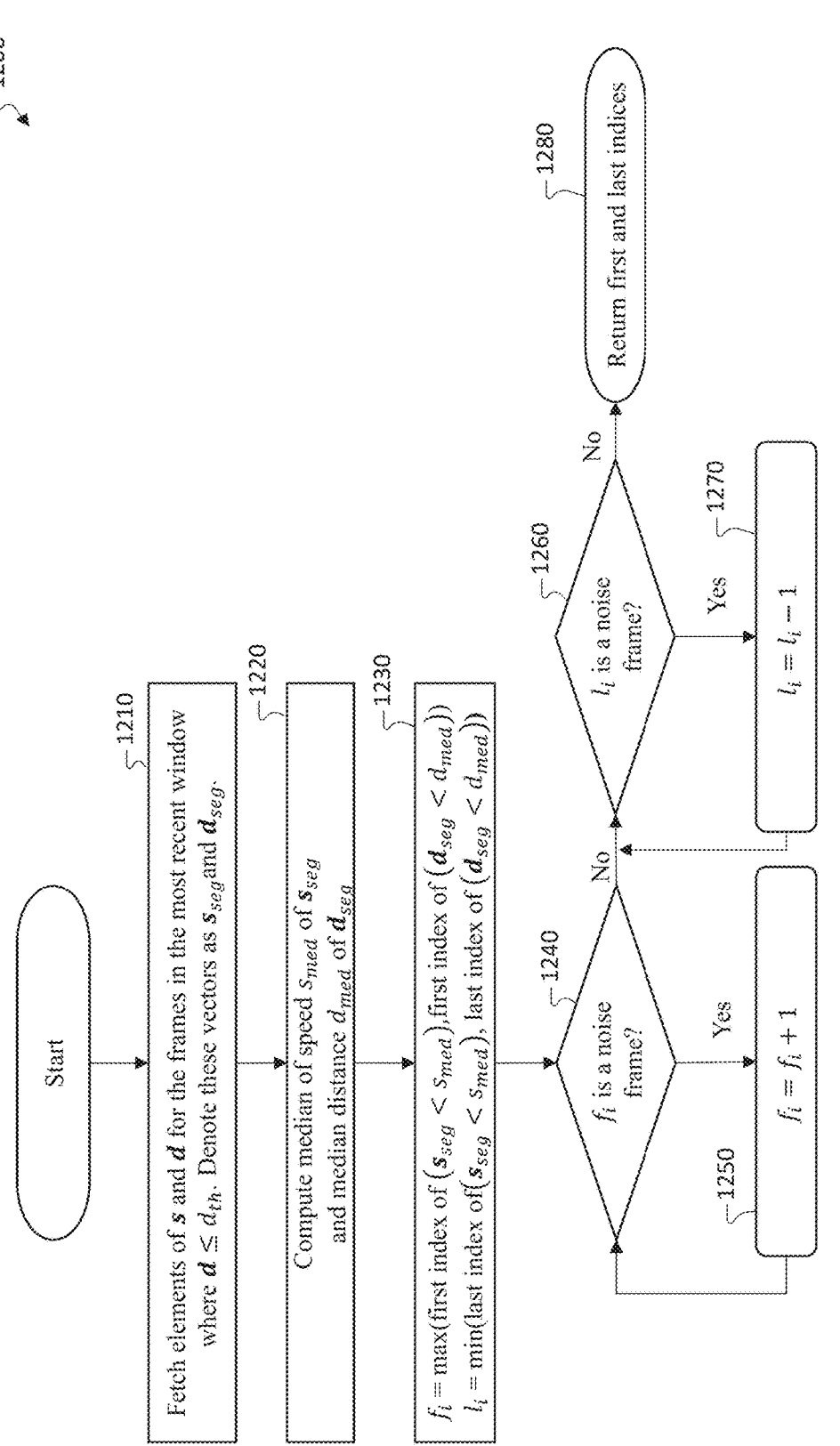
FIG. 12 illustrates a method for gesture segmenting based on average speed and distance in accordance with an embodiment of this disclosure.

FIG. 12 illustrates a method 1200 for gesture segmenting based on average speed and distance in accordance with an embodiment of this disclosure. The embodiment of the method 1200 shown in FIG. 12 is for illustration only, and other embodiments could be used without departing from the scope of this disclosure. The method 1200 is described as being performed by the system 600 of FIG. 6, for ease of explanation. However, it is understood that the method is performed by a processor 240 of the electronic device 200 executing the applications 262.

Once either the ADM 620 has detected the end of the gesture after encountering a certain number of non-active frames or the target has moved beyond $d_{th}$, the gesture classification process of the GC 630 may begin. The input to the GC 630 is usually a sequence of past frames containing extracted features such as TVD/TAD. These frames that are input to the GC 630 could be selected in such a way as to not contain the frames corresponding to the hand approaching and hand receding segments (e.g., hand approaching frames 806 of FIG. 8A and hand receding frames of FIGS. 5A-5B).

If the system 600 elects to allow these non-gesture frames (i.e., corresponding to the hand approaching and hand receding) to be input to the GC 630, then the neural network (e.g., within the GC 630) may be trained with additional data where the frames that include hand approaching and moving away are part of the feature set. This additional data in the feature set may significantly increase the overhead of training. In this case, the process of training of the neural network includes: (1) obtaining and inputting each of various data windows that includes non-gesture frames and gesture frames that are sometimes sandwiched between the non-gesture frames; and (2) manually identifying the gesture frames; and (3) training the neural network to classify a gesture based on a feature set that includes any or a combination from among the hand approaching frames, the hand receding, the hand static frames, and the gesture frames.

Further, the complexity of the neural network also depends on the input feature dimension. If the system 600 elects to allow hand approaching and receding frames to be input to the GC 630, then the neural network is likely to be more complex compared to a neural network that is trained to receive gesture related frames (for example, only gesture frames) as the input. To address the above-described technical challenges, the system 600 according to embodiments of this disclosure executes the method 1200 to separate the gesture frames from the hand approaching and/or receding segments. Within the GS 650, the frames corresponding to the hand approaching and hand receding are determined as non-gesture frames.

Figure 13A:
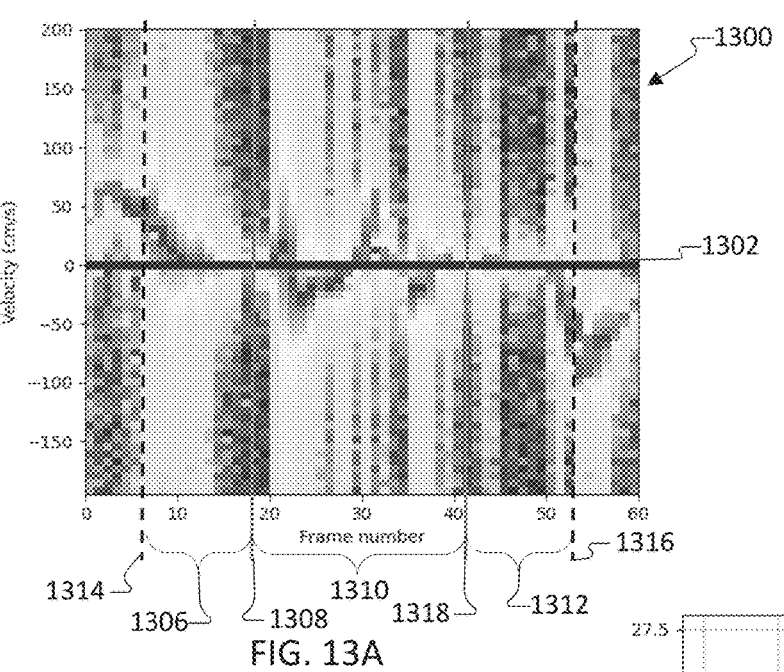
FIGS. 13A, 13B, and 13C illustrate various examples of extracted features that are extracted from the same set of raw radar data and that correspond to each other, in accordance with an embodiment of this disclosure.
Figure 13B:
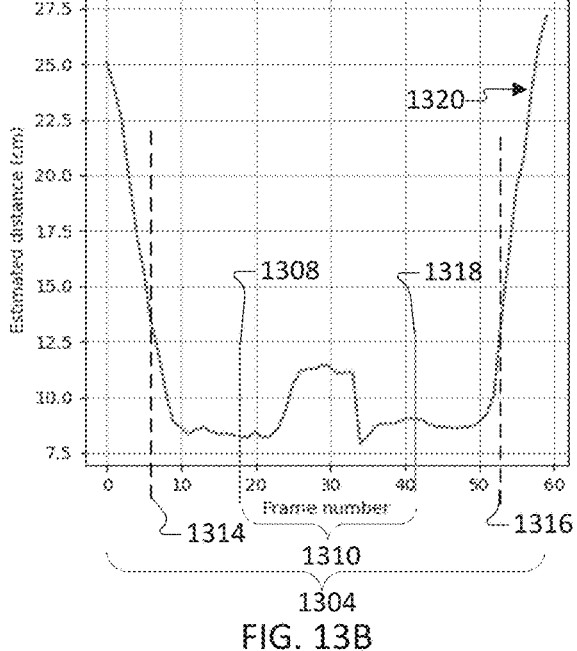
Figure 13C:
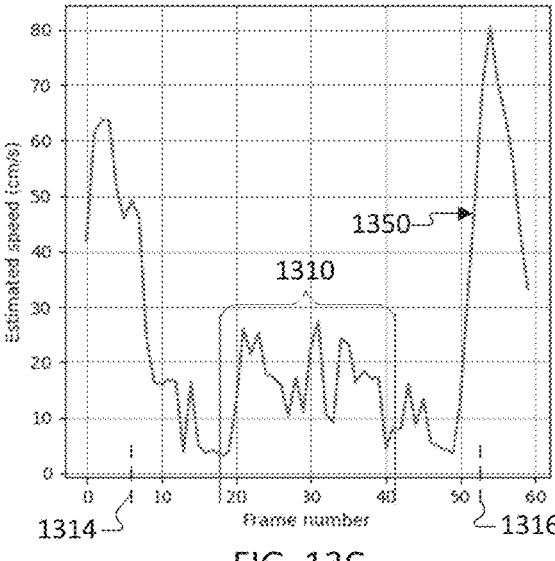

Refer temporarily to FIGS. 13A-13C (collectively FIG. 13), which are described together with FIG. 12 in order to more easily demonstrate reasoning for procedures within the method 1200. FIG. 13 illustrates various examples of extracted features that are extracted from the same set of raw radar data and that correspond to each other in accordance with an embodiment of this disclosure. FIG. 13A illustrates a TVD 1300 in accordance with an embodiment of this disclosure. FIG. 13B illustrates a graph of the estimated target distance 1320 extracted from the TVD 1300 of FIG. 13A. FIG. 13C illustrates a graph of the estimated target speed 1350 extracted from the TVD 1300 of FIG. 13A. The embodiments of the extracted features FIG. 13 are for illustration only, and other embodiments could be used without departing from the scope of this disclosure.

The horizontal line 1302, data window 1304 including a subset of Hand Approaching frames 1306, a subset of gesture frames 1310, and another subset of frames 1312 following the gesture frames 1310 are similar to corresponding components 802, 804, 806, 810, and 812 in FIGS. 8A-8B. For simplicity, the subset of frames 1312 are referred to as hand receding frames, although it can be observed in this particular example that the subset of frames 1312 includes some hand receding frames preceded by some hand static frames. A proximity entrance frame 1314 is the frame at which the hand enters into proximity to the electronic device, as indicated by the target distance being equal to (or less than) the distance threshold $d_{th}$. A proximity exit frame 1316 is the frame at which the hand exits out from proximity to the electronic device, as indicated by the target distance being equal to (or greater than) the distance threshold $d_{th}$.

In this example, the threshold distance $d_{th}$=15 cm is used in the process described in FIG. 12 and FIG. 9. In the TVD 1300 of FIG. 13A, the dotted black lines represent the proximity entrance and exit frames 1314 and 1316 that have statistics (such as estimated distance and speed) that are input to the GS 650. The solid red lines represent the first and last frames 1308 and 1318 that contain the gesture. The corresponding estimated distance 1320 and estimated speed 1350 are shown in FIGS. 13B and 13C.

As shown in FIGS. 13A and 13C, during the gesture frames 1310 the distance and speed of the finger is relatively less compared to during hand approaching frames 1306 and hand receding frames 1312. The median of the distances and the median speeds of the proximity frames is a good representative of the speed during the gesture frames 1310. Based on this observation, the GS 650 is configured to identify the first frame 1308 and last frame 1318 of a set of gesture frames 1310 that contains the performance of the gesture in its entirety.

Once the set of gesture frames 1310 containing the gesture has been identified, the GS 650 inputs the set of gesture frames 1310 to a validity checker 652 that analyzes additional validity conditions to check whether the gesture frames 1310 (i.e., radar data contained therein) is a valid gesture. As one example of a validity condition, the minimum number of gesture frames should be greater than a threshold in order to ensure that the set of gesture frames 1310 contains a valid gesture. This threshold can be a function of the number of frames in the shortest gesture (among the gesture vocabulary 632) and the ADM parameter N end (shown in FIG. 10 or FIG. 11).

Referring back to FIG. 12, at block 1210, from the extracted features 615 and/or gesture data 625, the GS 650 obtains elements of a speed vector s and distance vector d for the frames in the most recent data window 1304. In some embodiments, the GS 650 may not receive the entire data window 1304, but instead may only receive a segment of frames wherein the target is in proximity to the electronic device ($d \le d_{th}$), which may be referred to as proximity frames. For example, in FIG. 13, the proximity frames are from the proximity entrance frame 1314 through the proximity exit frame 1316, inclusively. For this segment of proximity frames, the distance vector and speed vector are denoted as $d_{seg}$ and $s_{seg}$. That is, the input for the gesture segmentation algorithm are the vectors $d_{seg}$ and $s_{seg}$ containing the estimated speed and distance of the target in all the frames where the fist/finger is within $d_{th}$ from the radar. It is not likely that every single one of these frames within the data window are contain the gesture, and accordingly, the objective of the GS 650 is to identify the gesture frames using the speed and distance information.

At block 1220, the GS 650 computes a median of speed $s_{med}$ and a median distance $d_{med}$ based on the input the GS 650 received. Particularly, for the segment of proximity frame inputted to the GS 650, the median of speed $s_{med}$ of $s_{seg}$ is computed, and the median distance $d_{med}$ of $d_{seg}$ is computed.

At block 1230, the GS 650 determines a first frame index $f_i$ and a last frame index $l_i$, which can define the bounds of the gesture frames 1310. More particularly, from among a subset of frames in which the target distance is less than the median distance $d_{med}$ (namely, a second proximity condition is satisfied if $d_{seg} < d_{med}$), the GS 650 a least frame index ($i_{fp}$) and a greatest frame index ($i_{lp}$). Additionally, from among another subset of frames in which the target speed is less than the median speed $s_{med}$ (namely, a velocity condition is satisfied if $s_{seg} < s_{meg}$), the GS 650 identifies a least frame index ($i_{fv}$) and a greatest frame index($i_{lv}$). Particularly, the GS 650 selects the maximum from among the least frame indices $i_{fp}$, and $i_{fv}$, and the first frame index $f_i$ is determined as this selected least frame index. Further, the GS 650 selects the minimum from among the greatest frame indices $i_{lp}$ and $i_{lv}$, and the last frame index $l_i$ is determined as this selected greatest frame index.

In some embodiments, the method 1200 can proceed from block 1230 to block 1280. At block 1280, the GS 650 returns the first frame index $f_i$ and the last frame index $l_i$. In some other embodiments, the method 1200 proceeds from block 1230 to block 1240, in order to further eliminate the non-gesture noisy frames by comparing the gesture frames 1310 to a threshold velocity $v_{th}$ or any other suitable energy-based metrics (e.g., MET) described in this disclosure. Once the noisy frames are removed, the validity checker 652 checks the length (e.g., $l_g$ 645c) of the gesture frames and allow the gesture frames to be provided to the gesture classifier 630 if the length is more than a length threshold ($l_{th}$).

At block 1240, if the GS 650 determines the radar frame assigned the first frame index $f_i$ is a noise frame, then the method 1200 proceeds to block 1250 to increment the first frame index $f_i$. After the first frame index $f_i$ has been incremented at block 1250, the method returns to block 1240 to determine whether the radar frame assigned the updated first frame index $f_i$ is a noise frame.

At block 1260, in response to a determination that the radar frame assigned the first frame index $f_i$ is not a noise frame, the GS 650 determines whether the radar frame assigned the last frame index $l_i$ is a noise frame. If the radar frame assigned the last frame index $l_i$ is a noise frame, then the method 1200 proceeds to block 1270 to decrement the last frame index $l_i$. After decrementing, the method 1200 returns to block 1260 to determine whether the radar frame assigned the updated last frame index $l_i$, is a noise frame. The method proceeds from block 1260 to block 1280 in response to a determination that the radar frame assigned the last frame index $l_i$ is not a noise frame. At block 1280, the GS 650 returns the first frame index $f_i$ and the last frame index $l_i$, thereby enabling the GS 650 to modify the data window 1304 by discarding frames that are not inclusively between the first frame index $f_i$ and the last frame index $l_i$.

Although FIG. 12 illustrates one example method 1200 for gesture segmentation, various changes can be made to FIG. 12. For example, various components in FIG. 12 can be combined, further subdivided, or omitted and additional components can be added according to particular needs. As a particular example, the procedures at blocks 1240 and 1260 could execute in concurrently, which would reduce latency.

Figure 14:
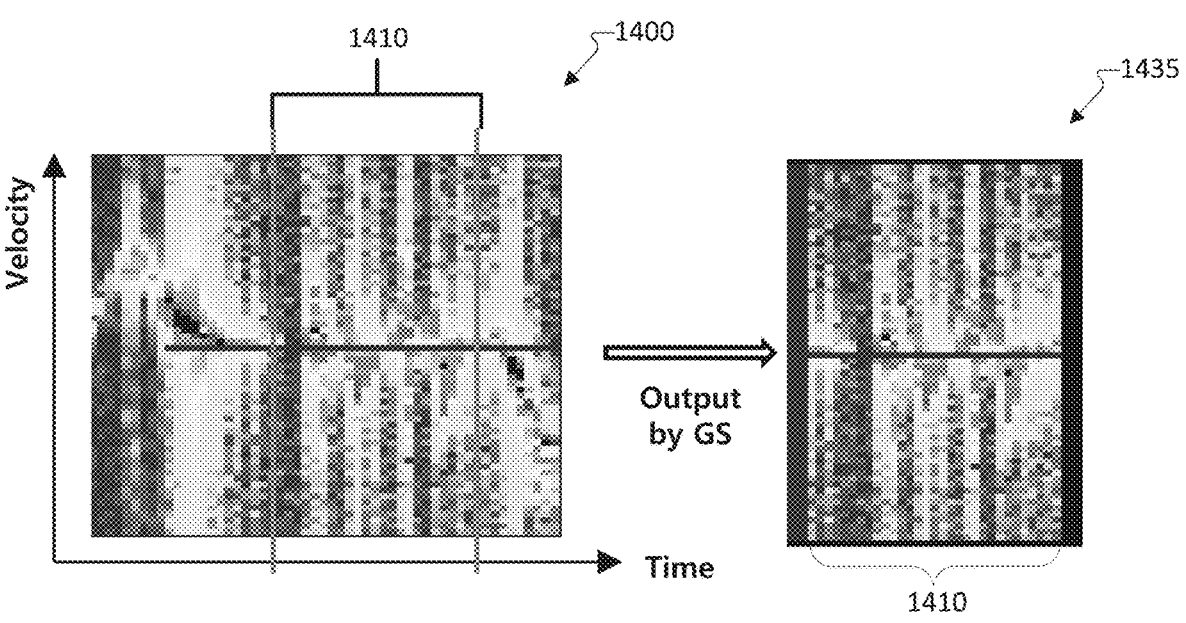
FIGS. 14 and 15 illustrate a TVD input and a TVD output that demonstrate effectiveness of a gesture segmenter in separating the gesture frames from the non-gesture frames in the case of different scenarios, in accordance with an embodiment of this disclosure.
Figure 15:
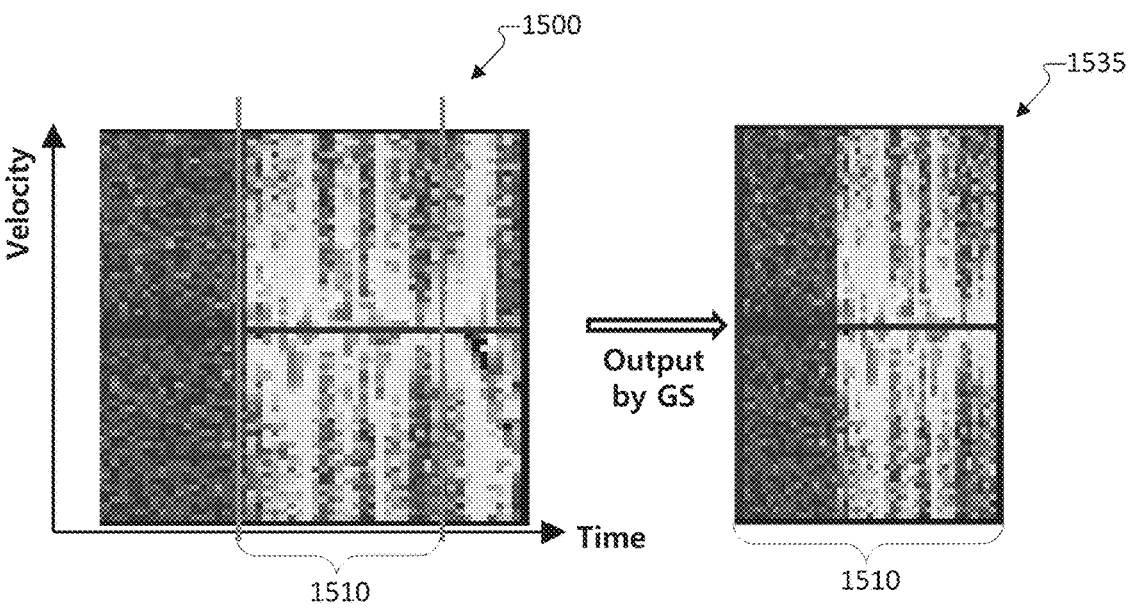

Each of FIGS. 14 and 15 illustrate a TVD input and a TVD output that demonstrate effectiveness of the gesture segmenter in separating the gesture frames from the non-gesture frames in the case of different scenarios, Scenario 1 and Scenario 2, respectively, in accordance with an embodiment of this disclosure. The embodiment of the input and output TVDs shown in FIGS. 14 and 15 are for illustration only, and other embodiments could be used without departing from the scope of this disclosure. The TVD input can represent the extracted features 615 or gesture data 625 of FIG. 6 or the data window 1304 or segment of proximity frames (including 1306, 1310, 1312) of FIG. 13. The TVD output represents the modified gesture data 635 of FIG. 6.

Particularly, in FIG. 14, the TVD input 1400 includes hand approaching frames, gesture frames 1410, and hand receding frames. The TVD output 1435 includes the gesture frames 1410, demonstrating that the non-gesture frames have been discarded (e.g., trimmed out from the radar data) by the GS 650. FIG. 14 corresponds to Scenario 1.

Particularly, in FIG. 15, the TVD input 1500 includes hand already in proximity frames, gesture frames 1510, and hand receding frames. The TVD output 1535 includes the gesture frames 1510, demonstrating that the non-gesture frames have been discarded. FIG. 15 corresponds to Scenario 2.

FIGS. 16, 17, and 18 illustrate tables that demonstrate the effectiveness of the GS 650 in terms of the following metrics: (1) ability to accurately segment the gesture frames from the non-gesture frames related to the hand approaching and moving away from the device, (2) the reduction in number of false positives when GS works in conjunction with an ML-based ADM compared to the ADM only operation, and (3) the reduction in latency due to GS. The examples effectiveness results shown in FIGS. 16, 17, and 18 are for illustration only, and other embodiments could be used without departing from the scope of this disclosure.

FIG. 16 illustrates a table that demonstrates segmentation performance of the GS 650 in accordance with an embodiment of this disclosure. Column 1 lists each of the different gestures among the gesture vocabulary 632. For each gesture in the gesture vocabulary 632, samples were collected for approximately 6 minutes. Each sample represents a respective performance of the gesture, and each sample is a data window containing radar data detected during the performance of the gesture. Column 2 shows a total number of samples input to the GS 650. Column 3 shows that a number of samples cut at the beginning. A sample is cut at the beginning if the GS 650 removes two or more frames at the beginning of the gesture with respect to the ground truth start of the gesture. Similarly, column 4 shows that a sample is cut at the end if the GS 650 removes two or more frames at the end of the gesture with respect to the ground truth end of the gesture. The GS 650 worked in conjunction with a machine leaning based (ML-based) ADM. As results of the operating the GS 650, it can be observed from FIG. 16 that approximately 8% of the samples are cut at the beginning. However, the median number of missed frames is relatively low, as shown in column 5. Further, the GS segmented the end of the gesture accurately, as shown in column 4.

FIG. 17 illustrates a table in which a number of false positives generated by a system that includes operations of both the ADM and the GS in accordance with an embodiment of this disclosure is compared to the number of false positives generated by a different system that includes operation of the ADM and does not include operation of the GS. In table of FIG. 17, the performance of the ADM 620 and GS 650 is compared with to the performance of the ADM 620 only. In the case of operating the ADM and GS, column 3 shows the number of detections, and column 5 shows the number of false positives. In the case of operating the ADM only, column 4 shows the number of detections, and column 6 shows the number of false positives. It can be observed from FIG. 17 there is a significant reduction in the number of false positives for all the gestures. In the case of operating the ADM and GS, observe that 7 false negatives out of which one is for Pinch Double gesture and the rest are for Swipe left-to-right (L2R) gesture.

FIG. 18 illustrates a table in which median latency generated by a system that includes operations of both the ADM and the GS in accordance with an embodiment of this disclosure is compared to the median latency generated by a different system that includes operation of the ADM and does not include operation of the GS. The table of FIG. 18 demonstrates a reduction in latency, the median latency of ADM and GS operation is compared to the median latency of ADM only operation. The average median latency for all the gesture is 826 milliseconds for ADM only operation, as shown in column 3. In contrast, with ADM and GS operation, the average median latency reduces by approximately 37% to 518 milliseconds, as shown in column 2.

Figure 19:
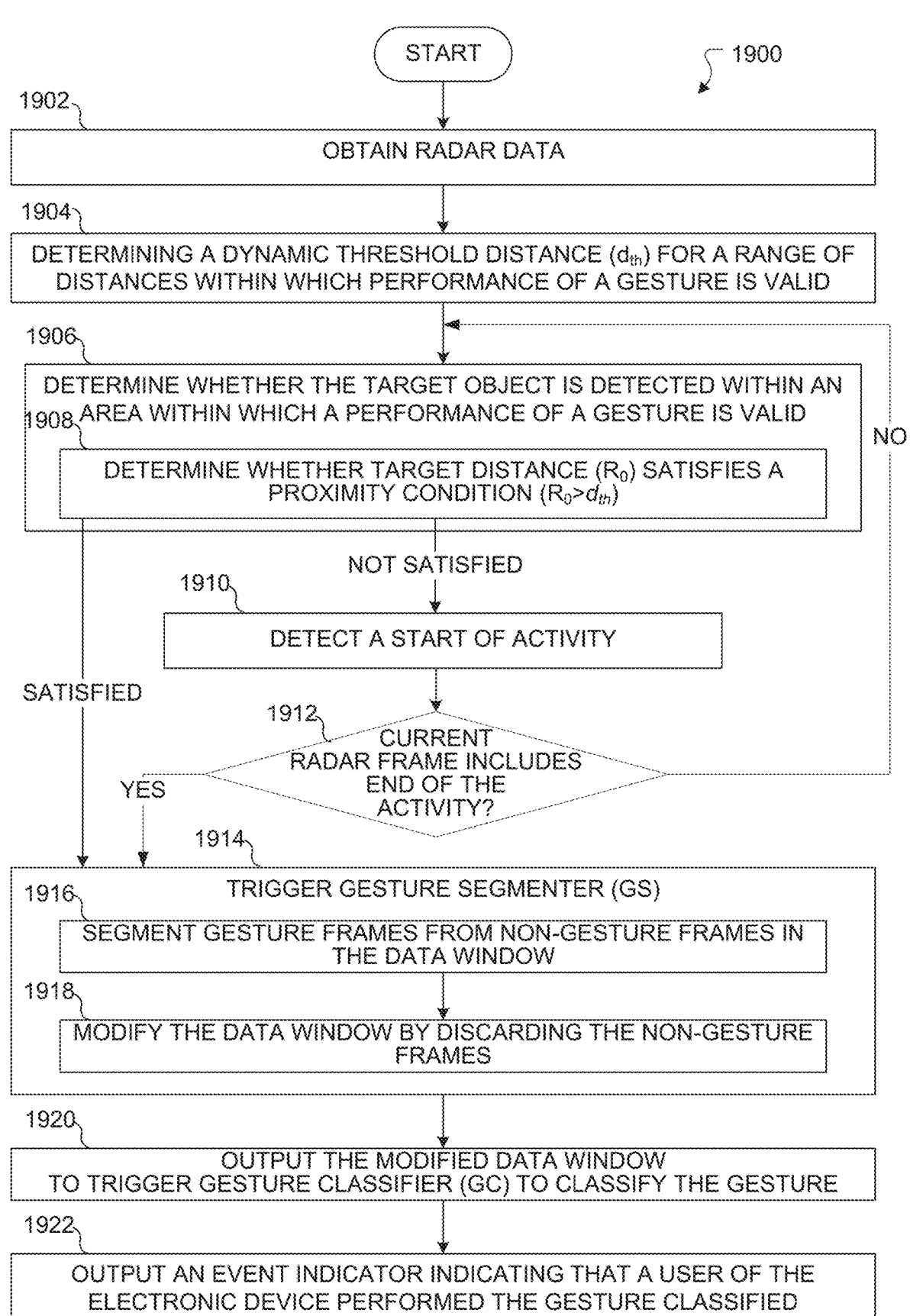
FIG. 19 illustrates a method for enabling dynamic gesture input for micro-gesture recognition in accordance with an embodiment of this disclosure.

FIG. 19 illustrates a method 1900 for enabling dynamic gesture input for micro-gesture recognition in accordance with an embodiment of this disclosure. The embodiment of the method 1900 shown in FIG. 19 is for illustration only, and other embodiments could be used without departing from the scope of this disclosure. The method 1900 is implemented by an electronic device 200. More particularly, the method 1900 could be performed by a processor 240 of the electronic device 200 executing the applications 262 (including one or more applications for micro-gesture recognition). For ease of explanation, the method 1800 is described as being performed by the processor 240.

At block 1902, the processor 240 obtains radar data. Particularly, the processor 240 obtains a target distance and target velocity for each radar frame within a sliding input data window. The sliding input data window includes a current radar frame and previous radar frames from radar data (for example, raw radar data). Each radar frame within the data window includes extracted features of at least one of time-velocity data (TVD) or time angle data (TAD).

At block 1904, the processor 240 determines, based on the TVD or TAD, a dynamic threshold distance ($d_{th}$) for a range of distances within which performance of a gesture is valid.

In some embodiments, the processor 240 dynamically determines the threshold distance based on a variation of the target distances within $n_t$ latest radar frames in the data window. Particularly, the processor 240 determines a gesture distance where a gesture is likely to be performed, based on based on the start of the activity. The processor 240 calculates the variation as a standard deviation ($\sigma_{th}$) of the target distances, and determines the threshold distance as a sum of the $\sigma_{th}$ and the gesture distance.

In some embodiments, to dynamically determine the threshold distance, the processor 240 updates the gesture distance based on an average of the target distances within $n_t$ latest radar frames in the data window. Further, the processor 240 determines the threshold distance as a sum of the $\sigma_{th}$ and the updated gesture distance.

At block 1906, the processor 240 can determine whether the target distance R corresponding to the current radar frame within an area (e.g., first area 120 f FIG. 1) within which a performance of a gesture is valid. For example, At block 1908, the processor 240 determines whether the target distance R corresponding to the current radar frame satisfies a first proximity condition. The first proximity condition is defined based on the threshold distance $d_{th}$.

At block 1910, in response to a determination that the first proximity condition is not satisfied, the processor 240 detects a start of activity based on the TVD or TAD.

At block 1912, the processor 240 determines whether the current frame includes the end of the activity. Particularly, the processor 240 determines whether the target velocity of the current frame is less than a threshold velocity $v_{th}$. In some embodiments, the processor 240 dynamically determines the threshold velocity ($v_{th}$) as an average velocity from the start of the activity to the current frame. The processor 240 increments a nonactive frame counter $N_{na}$ in response to a determination the target velocity is less than the threshold velocity $v_{th}$. The processor 240 determines whether the incremented $N_{na}$ is equal to a nonactive frames threshold $N_{end}$. In response to a determination the $N_{na}$ is equal to the $N_{end}$, the processor 240 determines that the current frame includes the end of the gesture.

At block 1914, the processor 240 triggers the gesture segmenter to segment gesture frames from non-gesture frames in the data window, in response to at least one of: a determination that the first proximity condition is satisfied, or a determination that the current radar frame includes an end of the activity.

At block 1916, the processor 240 segments gesture frames from non-gesture frames in the data window. To segment the data window, the processor 240 operates the GS.

As part of segmenting gesture frames from non-gesture frames in the data window, the processor 240 identifies, from the data window, a first subset of frames in which the target distance R satisfies the first proximity condition. The processor 240 calculates an average target distance $d_{med}$ and average target speed $s_{med}$ for the first subset of frames. The processor 240 identifies, from the first subset of frames, a second subset as the gesture frames in which: the target distance satisfies a second proximity condition defined by dined. The processor 240 identifies, from the first subset of frames, a third subset as the gesture frames in which: target velocity satisfies a velocity condition defined by $s_{med}$. The processor 240 identifies the non-gesture frames as a remainder of the first subset of frames that are not identified gesture frames.

In certain embodiments, to identify the second subset as the gesture frames, the processor 240 identifies a least frame index ($i_{fp}$) and a greatest frame index ($i_{lp}$), from among the first subset of frames in which the target distance satisfies a second proximity condition defined by $d_{med}$. From among the first subset of frames in which the target velocity satisfies the velocity condition, the processor 240 identifies a least frame index ($i_{fv}$) and a greatest frame index($i_{lv}$). The processor 240 determines, as a first frame index of the gesture frames, a greater one among $i_{fv}$, and $i_{fp}$. The processor 240 determines, as a last frame index of the gesture frames, a lesser one among $i_{lv}$, and $i_{lp}$. The identified gesture frames correspond to the first frame index through the last frame index.

At block 1918, the processor 240 modifies the data window by discarding the non-gesture frames. To modify the data window, the processor 240 operates the GS.

At block 1920, the processor 240 outputs, using the GS, the modified data window. For example, the processor 240 triggers the GC to classify the gesture by outputting the modified date window.

At block 1922, the processor 240 outputs an event indicator indicating that a user of the electronic device 200 performed the gesture classified.

Although FIG. 19 illustrates an example method 1900 for enabling dynamic gesture input for micro-gesture recognition, various changes may be made to FIG. 19. For example, while shown as a series of steps, various steps in FIG. 19 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
obtaining a target distance and target velocity for each radar frame within a sliding input data window that includes a current radar frame and previous radar frames from radar data, wherein each radar frame within the data window includes extracted features of at least one of time-velocity data (TVD) or time angle data (TAD);
determining, based on the TVD or TAD, a dynamic threshold distance ($d_{th}$) for a range of distances within which performance of a gesture is valid;
determining whether the target distance corresponding to the current radar frame satisfies a first proximity condition based on the threshold distance ($d_{th}$);
in response to a determination that the first proximity condition is not satisfied, detecting a start of activity based on the TVD or TAD;
triggering a gesture segmenter (GS) to segment gesture frames from non-gesture frames in the data window, in response to at least one of:
a determination that the first proximity condition is satisfied, or
a determination that the current radar frame includes an end of the activity; and
modifying, using the GS, the data window by discarding the non-gesture frames.

2. The method of claim 1, further comprising:
segmenting gesture frames from non-gesture frames in the data window by:
identifying, from the data window, a first subset of frames in which the target distance satisfies the first proximity condition;
calculating an average target distance ($d_{med}$) and average target speed ($s_{med}$) for the first subset of frames;
identifying, from the first subset of frames, a second subset as the gesture frames in which:
the target distance satisfies a second proximity condition defined by $d_{med}$, and
the target velocity satisfies a velocity condition defined by $s_{med}$,
identifying the non-gesture frames as a remainder of the first subset of frames that are not identified gesture frames; and
outputting, using the GS, the modified data window.

3. The method of claim 2, wherein identifying the second subset as the gesture frames further comprises:
from among the first subset of frames in which the target distance satisfies a second proximity condition defined by $d_{med}$, identifying a least frame index ($i_{fp}$) and a greatest frame index ($i_{lp}$);
from among the first subset of frames in which the target velocity satisfies the velocity condition, identifying a least frame index ($i_{fv}$) and a greatest frame index ($i_{lv}$);
determining, as a first frame index of the gesture frames, a greater one among $i_{fv}$ and $i_{fp}$;
determining, as a last frame index of the gesture frames, a lesser one among $i_{lv}$ and $i_{lp}$, wherein the identified gesture frames correspond to the first frame index through the last frame index.

4. The method of claim 1, further comprising dynamically determining the threshold distance based on a variation of the target distances within $n_t$ latest radar frames in the data window, by:

determining a gesture distance where a gesture is likely to be performed, based on the start of the activity;

calculating the variation as a standard deviation ($\sigma_{th}$) of the target distances; and determining the threshold distance as a sum of the $\sigma_{th}$ and the gesture distance.

5. The method of claim 4, wherein dynamically determining the threshold distance further comprises:

updating the gesture distance based on an average of the target distances within $n_t$ latest radar frames in the data window; and determining the threshold distance as a sum of the $\sigma_{th}$ and the updated gesture distance.

6. The method of claim 1, further comprising determining whether the current radar frame includes the end of the activity by:

determining whether the target velocity of the current radar frame is less than a threshold velocity ($v_{th}$);

incrementing a nonactive frame counter ($N_{na}$) in response to a determination the target velocity is less than the threshold velocity ($v_{th}$);

determining whether the incremented $N_{na}$ is equal to a nonactive frames threshold ($N_{end}$); and in response to a determination the $N_{na}$ is equal to the $N_{end}$, determining that the current radar frame includes the end of the gesture.

7. The method of claim 6, further comprising dynamically determining the threshold velocity ($v_{th}$) as an average velocity from the start of the activity to the current radar frame.

8. The method of claim 1, further comprises segmenting, by the triggered GS, gesture frames from non-gesture frames in the data window;

wherein triggering the GS to segment gesture frames from non-gesture frames in the data window comprises:

triggering the GS that is configured to, when triggered, segment gesture frames from non-gesture frames in the data window; and wherein the first proximity condition is satisfied when the target distance is greater than the dynamic threshold distance ($d_{th}$).

9. An electronic device comprising:

a transceiver; and a processor operatively connected to the transceiver, the processor configured to:

obtain a target distance and target velocity for each radar frame within a sliding input data window that includes a current radar frame and previous radar frames from radar data, wherein each radar frame within the data window includes extracted features of at least one of time-velocity data (TVD) or time angle data (TAD);

determine, based on the TVD or TAD, a dynamic threshold distance ($d_{th}$) for a range of distances within which performance of a gesture is valid;

determine whether the target distance corresponding to the current radar frame satisfies a first proximity condition based on the threshold distance ($d_{th}$);

in response to a determination that the first proximity condition is not satisfied, detect a start of activity based on the TVD or TAD;

trigger a gesture segmenter (GS) to segment gesture frames from non-gesture frames in the data window, in response to at least one of:

a determination that the first proximity condition is satisfied, or a determination that the current radar frame includes an end of the activity; and modify, using the GS, the data window by discarding the non-gesture frames.

10. The electronic device of claim 9, wherein the processor is further configured to:

segment gesture frames from non-gesture frames in the data window by:

identifying, from the data window, a first subset of frames in which the target distance satisfies the first proximity condition;

calculating an average target distance ($d_{med}$) and average target speed ($s_{med}$) for the first subset of frames;

identifying, from the first subset of frames, a second subset as the gesture frames in which:

the target distance satisfies a second proximity condition defined by $d_{med}$, and the target velocity satisfies a velocity condition defined by $s_{med}$;

identifying the non-gesture frames as a remainder of the first subset of frames that are not identified gesture frames; and outputting, using the GS, the modified data window.

11. The electronic device of claim 10, wherein to identify the second subset as the gesture frames, the processor is further configured to:

from among the first subset of frames in which the target distance satisfies a second proximity condition defined by $d_{med}$, identify a least frame index ($i_{fp}$) and a greatest frame index ($i_{lp}$);

from among the first subset of frames in which the target velocity satisfies the velocity condition, identify a least frame index ($i_{fv}$) and a greatest frame index ($i_{lv}$);

determine, as a first frame index of the gesture frames, a greater one among $i_{fv}$ and $i_{fp}$;

determine, as a last frame index of the gesture frames, a lesser one among $i_{lv}$ and $i_{lp}$;

wherein the identified gesture frames correspond to the first frame index through the last frame index.

12. The electronic device of claim 10, wherein the processor is further configured to dynamically determine the threshold distance based on a variation of the target distances within $n_t$ latest radar frames in the data window, by:

determining a gesture distance where a gesture is likely to be performed, based on based on the start of the activity;

calculating the variation as a standard deviation ($\sigma_{th}$) of the target distances; and determining the threshold distance as a sum of the $\sigma_{th}$ and the gesture distance.

13. The electronic device of claim 12, wherein to dynamically determining the threshold distance, the processor is further configured to:

update the gesture distance based on an average of the target distances within ne latest radar frames in the data window; and determine the threshold distance as a sum of the $\sigma_{th}$ and the updated gesture distance.

14. The electronic device of claim 9, wherein the processor is further configured to determine whether the current radar frame includes the end of the activity, by:

determining whether the target velocity of the current radar frame is less than a threshold velocity ($v_{th}$);

incrementing a nonactive frame counter ($N_{na}$) in response to a determination the target velocity is less than the threshold velocity ($v_{th}$);

determining whether the incremented $N_{na}$ is equal to a nonactive frames threshold ($N_{end}$); and in response to a determination the $N_{na}$ is equal to the $N_{end}$, determining that the current radar frame includes the end of the gesture.

15. The electronic device of claim 14, wherein the processor is further configured to dynamically determine the threshold velocity ($v_{th}$) as an average velocity from the start of the activity to the current radar frame.

16. A non-transitory computer readable medium embodying a computer program, the computer program comprising computer readable program code that when executed causes at least one processor to:

obtain a target distance and target velocity for each radar frame within a sliding input data window that includes a current radar frame and previous radar frames from radar data, wherein each radar frame within the data window includes extracted features of at least one of time-velocity data (TVD) or time angle data (TAD);

determine, based on the TVD or TAD, a dynamic threshold distance ($d_{th}$) for a range of distances within which performance of a gesture is valid;

determine whether the target distance corresponding to the current radar frame satisfies a first proximity condition based on the threshold distance ($d_{th}$);

in response to a determination that the first proximity condition is not satisfied, detect a start of activity based on the TVD or TAD;

trigger a gesture segmenter (GS) to segment gesture frames from non-gesture frames in the data window, in response to at least one of:

a determination that the first proximity condition is satisfied, or a determination that the current radar frame includes an end of the activity; and modify, using the GS, the data window by discarding the non-gesture frames.

17. The non-transitory computer readable medium of claim 16, further containing program code that when executed causes the at least one processor to:

segment gesture frames from non-gesture frames in the data window by:

identifying, from the data window, a first subset of frames in which the target distance satisfies the first proximity condition;

calculating an average target distance ($d_{med}$) and average target speed ($s_{med}$) for the first subset of frames;

identifying, from the first subset of frames, a second subset as the gesture frames in which:

the target distance satisfies a second proximity condition defined by $d_{med}$, and the target velocity satisfies a velocity condition defined by $s_{med}$, identifying the non-gesture frames as a remainder of the first subset of frames that are not identified gesture frames; and outputting, using the GS, the modified data window.

18. The non-transitory computer readable medium of claim 17, wherein the program code that when executed causes the at least one processor to identify the second subset as the gesture frames further comprise program code that when executed causes the at least one processor to:

from among the first subset of frames in which the target distance satisfies a second proximity condition defined by $d_{med}$, identify a least frame index ($i_{fp}$) and a greatest frame index ($i_{lp}$);

from among the first subset of frames in which the target velocity satisfies the velocity condition, identify a least frame index ($i_{fv}$) and a greatest frame index ($i_{lv}$);

determine, as a first frame index of the gesture frames, a greater one among $i_{fv}$ and $i_{fp}$;

determine, as a last frame index of the gesture frames, a lesser one among $i_{lv}$ and $i_{lp}$;

wherein the identified gesture frames correspond to the first frame index through the last frame index.

19. The non-transitory computer readable medium of claim 18, further containing program code that when executed causes the at least one processor to:

dynamically determine the threshold distance based on a variation of the target distances within $n_t$ latest radar frames in the data window, by:

determining a gesture distance where a gesture is likely to be performed, based on based on the start of the activity;

calculating the variation as a standard deviation ($\sigma_{th}$) of the target distances; and determining the threshold distance as a sum of the $\sigma_{th}$ and the gesture distance.

20. The non-transitory computer readable medium of claim 19, wherein the program code that when executed causes the at least one processor to dynamically determining the threshold distance further comprise program code that when executed causes the at least one processor to:

update the gesture distance based on an average of the target distances within $n_t$ latest radar frames in the data window; and determine the threshold distance as a sum of the $\sigma_{th}$ and the updated gesture distance.

21. The non-transitory computer readable medium of claim 16, wherein the program code that when executed causes the at least one processor to determine whether the current radar frame includes the end of the activity, by:

determining whether the target velocity of the current radar frame is less than a threshold velocity ($v_{th}$);

incrementing a nonactive frame counter ($N_{na}$) in response to a determination the target velocity is less than the threshold velocity ($v_{th}$);

determining whether the incremented $N_{na}$ is equal to a nonactive frames threshold ($N_{end}$); and in response to a determination the $N_{na}$ is equal to the $N_{end}$, determining that the current radar frame includes the end of the gesture.

\* \* \* \* \*